US011574206B2

(12) United States Patent
Butler, Jr. et al.

(10) Patent No.: US 11,574,206 B2
(45) Date of Patent: Feb. 7, 2023

(54) DEFENSE AND DENIAL METHOD

(71) Applicant: The Security Oracle, Inc., Clermont, FL (US)

(72) Inventors: Charles Lankford Butler, Jr., Clermont, FL (US); Samuel McArthur Smith, Lindon, UT (US); Vontella Kay Kimball, Clermont, FL (US)

(73) Assignee: The Security Oracle, Inc., Clermont, FL (US)

( * ) Notice: Subject to any disclaimer, the term of this patent is extended or adjusted under 35 U.S.C. 154(b) by 445 days.

(21) Appl. No.: 14/729,089

(22) Filed: Jun. 3, 2015

(65) Prior Publication Data

US 2015/0347902 A1 Dec. 3, 2015

Related U.S. Application Data

(60) Provisional application No. 62/130,367, filed on Mar. 9, 2015, provisional application No. 62/006,976, filed on Jun. 3, 2014.

(51) Int. Cl.
*G06N 5/02* (2006.01)
*G08B 25/00* (2006.01)
(Continued)

(52) U.S. Cl.
CPC ........... *G06N 5/022* (2013.01); *G06F 21/554* (2013.01); *G08B 13/122* (2013.01);
(Continued)

(58) Field of Classification Search
None
See application file for complete search history.

(56) References Cited

U.S. PATENT DOCUMENTS 7,843,375 B1 * 11/2010 Rennie .................... G01S 7/021
342/16
8,248,473 B2 8/2012 Graber
(Continued)

FOREIGN PATENT DOCUMENTS

| JP | 2005296510 A | 10/2005 |
| JP | 2006092035 A | 4/2006 |
| JP | 2013125469 A | 6/2013 |

OTHER PUBLICATIONS

Keil, T. et al., "The Design-Basis Threat," downloaded from <info.publicintelligence.net/DHS-DesignBasisThreat.pdf> and verified availabe online by the Internet Archive as of at least Mar. 10, 2013.*
(Continued)

*Primary Examiner* — Brian M Smith
(74) *Attorney, Agent, or Firm* — Buchanan Ingersoll & Rooney PC

(57) ABSTRACT

The presently disclosed method and system includes a network of computer devices, sensors, and actuators operating in concert with application software to actively detect, identify, and localize threats and generate real-time countermeasures designed to delay and/or mitigate damage that may be caused by the threats. Application software, in the form of automated reasoning and logic control, initiates preparatory and countermeasure sequences automatically, which may be used by users or automatically executed by the system to at least delay an attack to a physical asset/area by adversaries with use of non-lethal actuators. Learned scenarios are generated and continuously adapted via feedback loops and decision rules to provide preparatory and countermeasure sequences that maximize results with minimal expenditure of assets.

20 Claims, 16 Drawing Sheets

(51) Int. Cl.
  *G08B 31/00*    (2006.01)
  *G08B 13/196*   (2006.01)
  *G08B 25/10*    (2006.01)
  *G08B 13/12*    (2006.01)
  *G08B 15/00*    (2006.01)
  *G06F 21/55*    (2013.01)

(52) U.S. Cl.
  CPC ....... *G08B 13/19645* (2013.01); *G08B 15/00* (2013.01); *G08B 25/009* (2013.01); *G08B 25/10* (2013.01); *G08B 31/00* (2013.01)

(56) References Cited

U.S. PATENT DOCUMENTS

| | | | | |
|---|---|---|---|---|
| 8,312,549 B2* | 11/2012 | Goldberg | ............... | G06Q 40/08 726/25 |
| 8,384,542 B1 | 2/2013 | Merrill et al. | | |
| 8,471,700 B1 | 6/2013 | Merrill et al. | | |
| 8,674,831 B1* | 3/2014 | Merrill | ............... | G08B 25/004 340/541 |
| 9,000,918 B1* | 4/2015 | McLaughlin | ........ | G08B 13/122 340/540 |
| 9,349,103 B2* | 5/2016 | Eberhardt, III | ........ | G06N 7/005 |
| 2001/0011257 A1* | 8/2001 | Le Van Suu | ............. | G06N 7/04 706/4 |
| 2002/0019697 A1* | 2/2002 | Cong | ................... | G01S 13/723 701/301 |
| 2002/0099672 A1* | 7/2002 | Ganesh | ............. | G05B 13/0275 706/1 |
| 2004/0257223 A1 | 12/2004 | Webb, Sr. | | |
| 2006/0031934 A1 | 2/2006 | Kriegel | | |
| 2007/0011105 A1* | 1/2007 | Benson | ................ | G07G 1/0036 706/1 |
| 2007/0113281 A1* | 5/2007 | Leach | .................... | G06Q 40/08 726/22 |
| 2009/0045936 A1 | 2/2009 | Miller | | |
| 2013/0013551 A1* | 1/2013 | Mathews | ............... | G06N 5/048 706/52 |
| 2013/0031037 A1* | 1/2013 | Brandt | ................... | G06N 20/00 706/12 |
| 2013/0159242 A1* | 6/2013 | Rahmouni | ....... | G06Q 10/06313 706/52 |
| 2014/0070947 A1 | 3/2014 | Ionson | | |
| 2014/0090071 A1* | 3/2014 | Salehie | ................ | H04L 63/1408 726/25 |

OTHER PUBLICATIONS

International Search Report and Written Opinion for PCT/US15/33878 dated Sep. 2, 2015.
European Office Action dated Aug. 3, 2017, of the corresponding European Patent Application No. EP 15 802 735.9 (7 pages).
Japanese Office Action dated May 29, 2019, of the corresponding Japanese Patent Application No. JP 2017-516253 (5 pages).
Canadian Office Action dated Jul. 13, 2020 for CA Application No. 2,949,979 filed Jun. 3, 2015.
Canadian Office Action dated Nov. 27, 2020 for Canadian Application No. 2,949,979.

\* cited by examiner

RCADS = MAJOR SAVINGS

ON-SITE SECURITY FORCE WITH PASSIVE PPS (SINGLE SITE EXAMPLE)

SUBSTATION PROTECTIVE FORCE

| FOUR PERSON RAPID RESPONSE UNIT | FTEs (INCLUDING PREP & TRAVEL TIME) | TOTAL FTEs | AVE HOURLY LOADED FTE LABOR RATE | TOTAL ANNUAL FTE HOURS | TOTAL FTE ANNUAL COST |
|---|---|---|---|---|---|
| 4 | 6 | 24 | $50.00 | 499.20 | $2,496,000.00 |

| PASSIVE PHYSICAL PROTECTION SYSTEM (PPS) COST ESTIMATE | |
|---|---|
| | $3,000,000.00 |
| ANNUAL MAINTENANCE @ 15% AFTER 1ST YEAR | $450,000.00 |
| FIRST YEAR COST OF OWNERSHIP (COMBINED) | $5,496,000.00 |
| FIVE (5) YEAR COST OF OWNERSHIP (COMBINED) | $17,280,000.00 |
| TEN (10) YEAR COST OF OWNERSHIP (COMBINED) | $32,010,000.00 |

RCADS REQUIRES NO ON-SITE SECURITY FORCE (SINGLE SITE COMPARISON)

| ACTIVE RCADS PASSIVE PHYSICAL PROTECTION SYSTEM (PPS) COST ESTIMATE | |
|---|---|
| | $4,200,000.00 |
| | (INCL PASSIVE PPS) |
| ANNUAL MAINTENANCE @ 15% AFTER 1ST YEAR | $630,000.00 |
| FIRST YEAR COST OF OWNERSHIP (NO ON-SITE) | $4,200,000.00 |
| FIVE (5) YEAR COST OF OWNERSHIP | $6,720,000.00 |
| TEN (10) YEAR COST OF OWNERSHIP | $9,870,000.00 |

| ACTIVE RCADS PASSIVE PHYSICAL PROTECTION SYSTEM (PPS) COST ESTIMATE | |
|---|---|
| FIVE (5) YEAR COST SAVINGS | $10,560,000.00 |
| TEN (10) YEAR COST SAVINGS | $22,140,000.00 |

FIG. 6B

RESULTS SUMMARY | OVERVIEW

BELOW ARE THE COMPILED AVERT ANALYTICAL RESULTS, FROM THE PERSPECTIVE OF GENERIC SITE (LEFT) AND MANAGEMENT OF A FLEET OF 40 THEORETICAL OF SUBSTATIONS (RIGHT). THE OPTIMAL CHOICE DEPENDS ON THE PERSPECTIVE. GIVEN A SIMILAR SNIPER TYPE ATTACK AT GENERIC SUBSTATION, THE RCADS SYSTEM DEMONSTRATES THE OPTIMAL CHOICE. WITH A LOW COST OF IMPLEMENTATION WHILE MAINTAINING HIGH EFFECTIVENESS AND LOW DAMAGE RATES. HOWEVER, FOR A FLEET OF SITES, ANY ONE WIDE-SCALE SECURITY IMPLEMENTATION DOMINATES THE COST FOR A FLEET. IN NEITHER CASE IS THE MANNED SOLUTION THE OPTIMAL CHOICE AS THE DAMAGE RATES AND COSTS ARE HIGHER THEN THE RCADS

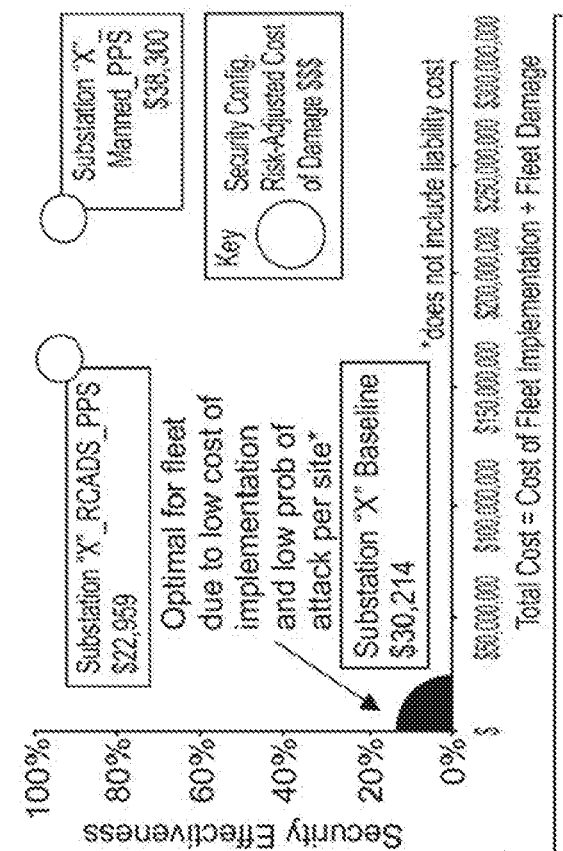

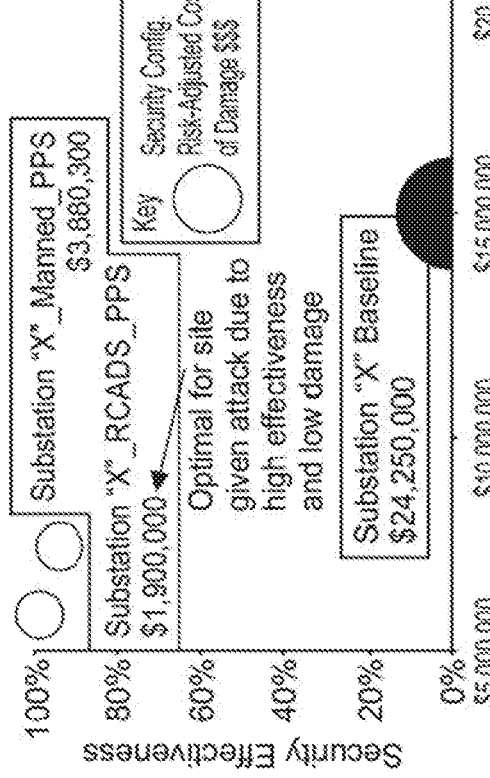

FIG. 6C

EXAMPLE DESIGN BASIS THREAT (DBT) SPECTRUM FOR ELECTRIC POWER INFRASTRUCTURE

(Develop attack scenarios based on postulated threat spectrum for each location)

THREAT #1

| Adversary | No. of Adv. | Knowledge | Equipment/ Vehicles | Weapons | Objective |
|---|---|---|---|---|---|
| High Level Outsider (Terrorist or Activist) | 3 to 5 | Extensive knowledge of electric power operations, security systems, and DCS/SCADA systems. | Hand tools, power tools, explosives, personal vehicles. | Firearms, explosives. | 1) Destruction of infrastructure and disruption of service. 2) Loss of public confidence |

THREAT #2

| Adversary | No. of Adv. | Knowledge | Equipment/ Vehicles | Weapons | Objective |
|---|---|---|---|---|---|
| Medium to High Level - Insider (Disgruntled, Current or Former Employee) | 1 to 2 | Knowledge (Some to Extensive) of electric power operations, security systems, and DCS/SCADA systems. | Hand tools, power tools, and personal vehicles. | Firearms, explosives, knives. | Destruction of infrastructure, equipment and cause of financial harm or hardship to current staff/management. |

THREAT #3

| Adversary | No. of Adv. | Knowledge | Equipment/ Vehicles | Weapons | Objective |
|---|---|---|---|---|---|
| Medium Level Outsiders w/ Insider Knowledge (Extremist) | 2 to 3 | Moderate knowledge of electric power systems | Hand tools, power tools, and personal vehicles. | None | Disruption of service, cause of financial hardship, notoriety, embarrassment of company. |

THREAT #4

| Adversary | No. of Adv. | Knowledge | Equipment/ Vehicles | Weapons | Objective |
|---|---|---|---|---|---|
| Low to Medium Level Outsider (Vandal) | 1 to 5 | Little or no knowledge of electric power systems. | Hand tools, personal vehicles. | Handguns, knives. | Damage of equipment or notoriety. |

FIG. 10

DEFENSE AND DENIAL METHOD

CROSS-REFERENCE TO RELATED APPLICATIONS

This patent application claims the benefit of U.S. Provisional Patent Application No. 62/006,976, filed on Jun. 3, 2014, and U.S. Provisional Patent Application No. 62/130,367, filed on Mar. 9, 2015, which are both hereby incorporated by reference in their entireties.

BACKGROUND OF THE INVENTION

Field of the Invention

Embodiments of the presently disclosed method and system include a network of computer devices, sensors, and actuators operating in concert with application software to actively detect, identify, and localize threats and generate real-time countermeasures designed to delay and/or mitigate damage that may be caused by the threats.

Background of the Related Art

Damage to physical assets, such as utility and power stations can result in wide spread disruption and significant costs. For example, there are about 55,000 electric power substations in the United States, and damage to each can cost anywhere from a few million to tens or hundreds of millions of dollars in lost physical assets and lost revenue from power interruption. Yet, current passive protection systems cannot protect against terrorist style attacks. Furthermore, current passive protection systems are noncompliant with regulations implemented by the Federal Energy Regulatory Commission (FERC) on Nov. 20, 2014, which has created an even greater impetus to find an improved way to prevent adversaries from successfully attacking these critical infrastructures, as well as other similar infrastructures.

Prior art in the field consists of physical security in the form of human security on site and responder personnel. However, stationing forces onsite is prohibitively expensive. Additionally, responder forces typically take from 3-5 minutes at best, and up to 3 hours to arrive. By that time the damage has been done.

Another form of prior art security in the field consists of passive physical protection systems, such as, for example, cameras for detection, fences for ballistic protection or impeded access, etc. However, passive physical protection systems can be overcome due to a lack of actively resisting the adversary. Such systems also fail to take other active measures and/or countermeasures to mitigate and/or extinguish the threat exposed to the physical asset. Another inadequacy is the failure to adaptively respond to an occurrence, such as a terrorist style attack, so as to coordinate responses, optimize results, and minimize damage. In addition to failing to actively resisting the adversary, prior art systems do nothing to operate in concert with physical security once they arrive.

The inability of prior art to immediately, actively, and physically interdict adversaries, especially doing so beyond the perimeter of the area wherein the physical asset is located, is one reason why adversaries may be able to move quickly through their attack sequence without delay or disruption to their objective. The ability of a system to perform such a function may not only protect physical assets from hostile incidences, but when implemented in accordance with the disclosed method, may also comport with FERC regulations.

BRIEF SUMMARY OF THE INVENTION

Components of the system may include a computer and communications network, a sensor, an actuator, application software, various interfaces, and a human-in-the-loop. Operating in concert via application software, the system may generate automated responses to occurrences (e.g., attacks, terrorism, vandalism, theft, weather events, etc.) ranging from being fully automated to being conditioned on a user's execution thereof. The system employs sensors that detect, identify, and localize likely adversarial threats so that non-lethal actuators may automatically act at a distance to debilitate adversaries and/or attenuate the threat posed by the adversaries. Some embodiments provide for remote control hardware that may be used by a human-in-the-loop to remotely acquire targets and exercise discretion as whether to fire certain actuators to delay the adversary. Additional software may assist the human-in-the-loop to automatically acquire targets and develop responses in real-time based on learned scenarios executed by the system. The system utilizes a continuous feedback loop to dynamically detect and prioritize threats as they develop and generate countermeasures to actively delay the resultant effect of the threat. In the case of a terrorist attack, the system may be used to delay the terrorist from achieving their objectives long enough to enable responder personnel to interfere.

As an example, sensors may detect unauthorized presence of personnel near the premises of an electrical power substation and automatically direct cameras, initiate alarm sequences, acquire targeting signals, and aim weaponry (non-lethal and/or lethal) at the personnel. A user may then be able to take control of certain components (remotely or directly) to administer a non-lethal measure to repel the adversary with the benefit of time saved by actuators already being targeted on the adversaries. Nonlethal actuators may be preferred, which may exist in the form of directed emissions of light, sound, magnetic waves, chemicals, etc. Upon detection of the adversary, the system may execute probabilities of outcomes based on real-time data and learned scenarios to generate targeting and other countermeasure sequences so that the proper actuators and sensors become immediately involved with the response. These countermeasure sequences may be presented to the human-in-the-loop via an interface on a computer screen, thereby enabling the human-in-the-loop to carry out the countermeasure. In addition, or in the alternative, the countermeasure sequences may be used to prepare actuators and sensors for a conditioned execution by the human-in-the-loop and/or the system may automatically actuate some or all of the components without the conditioned execution by the user.

Logical control software may be used to implement decision-making algorithms to initiate preparatory sequences for the response to the threat. Automated reasoning software may be used to determine (in real-time and/or by pre-programmed parameters) which occurrences the system addresses and to which degree the system commands and controls the components of the system to generate an automated response to the threat. The continuous feedback loop enables the system to almost instantaneously determine the best course of action, considering factors of collateral damage, response time of physical security, minimization of costs and physical damage into a set of countermeasures that are augmented into a response or an active preparatory step for the response.

Closing the time gaps between detection, response, and neutralization of the threat enables realization of performance improvements that passive protection systems are unable to attain, and effectively stops an attack while complying with the new FERC regulations. In addition, efficiencies with regard to communications, data storage, and reduction of infrastructure are generated by coordination of activities of the various components in accordance with learned scenarios and countermeasure sequences, reduction of inefficient and redundant systems, and efficient allocation of computational and data storage resources.

The method and system enables thwarting attacks and/or causing significant delay to adversaries almost instantaneously (e.g., less than about 3 to 5 seconds), and affords a human-in-the-loop the opportunity to repeatedly engage the adversary as is necessary from a remote location.

While the method and system are described in relation to protecting a substation, applicability extends to any situation where the risk of damage to a physical asset and/or area is expected, and non-lethal measures to address the risk are suffice, or even preferred. This may be, but is not limited to, homes, boats, industrial complexes, airports, shipping ports, etc. The system may also be employed in other situations where similar exigencies may develop, such as the control of crowds and mobs (e.g., concert settings, protester venues, riots, etc.).

While these potential advantages are made possible by technical solutions offered herein, they are not required to be achieved. The presently disclosed system can be implemented to achieve technical advantages, whether or not these potential advantages, individually or in combinations, are sought or achieved.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages and possible applications of the present invention will be more apparent from the following more particular description thereof, presented in conjunction with the following drawings, in which:

FIGS. 6A-C are a failure analysis modeling display, a cost-benefit report, and a result summary report, respectively, that may be generated by the system;

FIG. 10 is an exemplary Design Basis Threat Spectrum.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
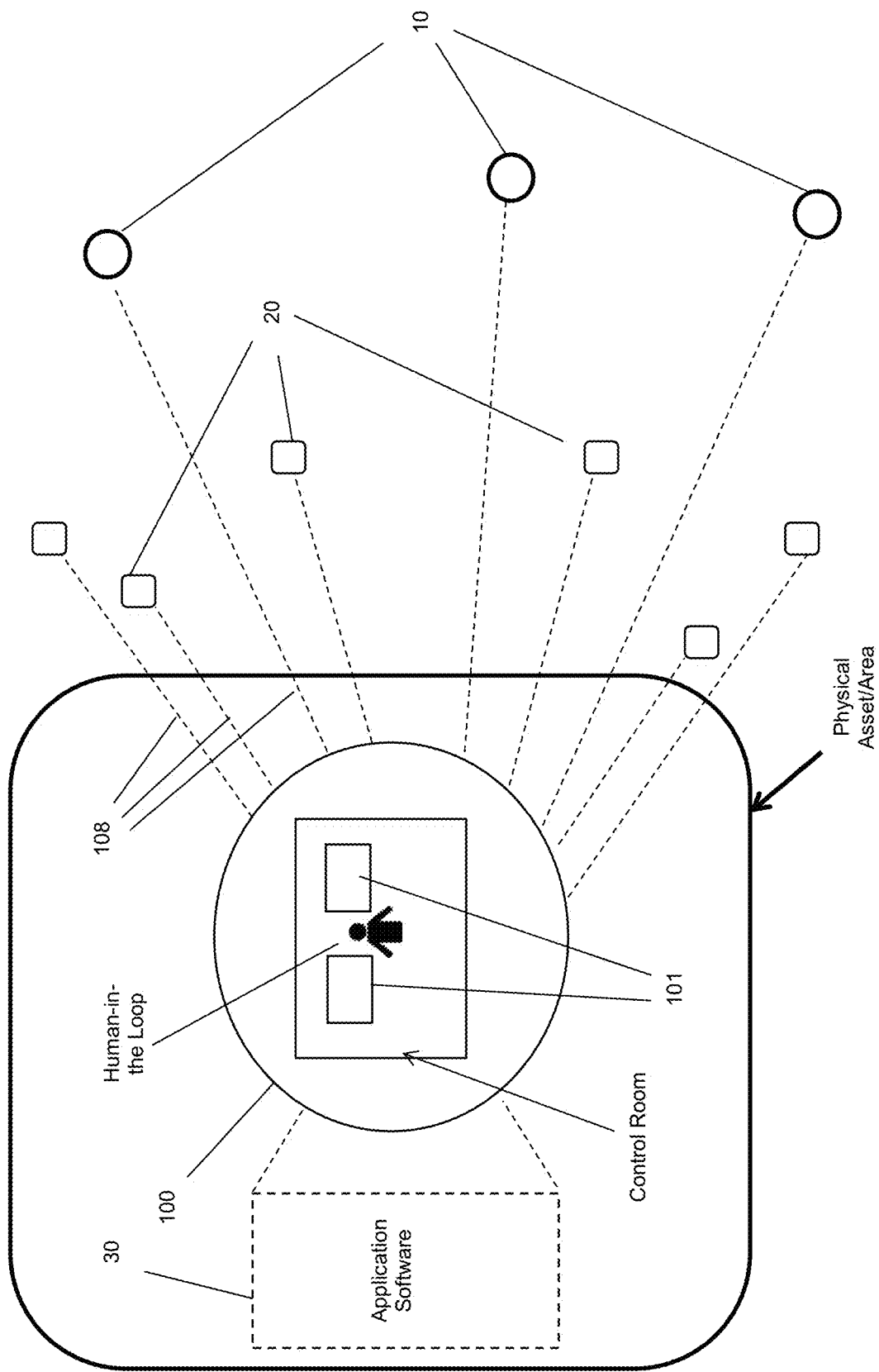
FIG. 1 illustrates components that may be used with the defense and denial system.

Referring now to FIG. 1, components of the system may include a computer network 100, at least one sensor 10, at least one actuator 20, application software 30, a human-in-the-loop, and user interfaces that operate in concert, generating automated responses to occurrences. Sensors 10 may detect, identify, and localize likely threats posed by the occurrences. Application software 30 determines a best course of action (or multiple courses of action with probabilistic outcomes) by which a concerted operation of system components is executed to address threats. The system may execute probabilities of outcomes based on learned scenarios and present these to the user via a display on a computer device 101 or execute countermeasures and/or preparatory measures automatically. Some embodiments enable a user to execute countermeasures through modules 109 and/or panels 110 (see FIG. 2) displayed by the application software 30 via graphical user interfaces (GUI). In addition, a continuous dynamic feedback loop may be used to provide dynamic and adaptive responses in real-time as occurrences evolve.

Sensor fusion and other techniques may be used to ascertain if the presence near a protected area/asset is a threat. Measured responses are generated in the form of countermeasures by which actuators 20 may be used to act at a distance from the physical asset/area to debilitate and incapacitate adversaries in a nonlethal manner before the adversary can move within a range in which they can cause damage to the physical asset/area. The responses are commensurate with the level of threat posed. For example, an activist merely attempting to make a political statement by breaking and entering may be subjected to a sequence of warnings upon detection before being subject to measures that may cause debilitating effects, whereas an armed adversary may be subjected to injurious, albeit non-lethal, measures upon detection.

Computer Network

Figure 2:
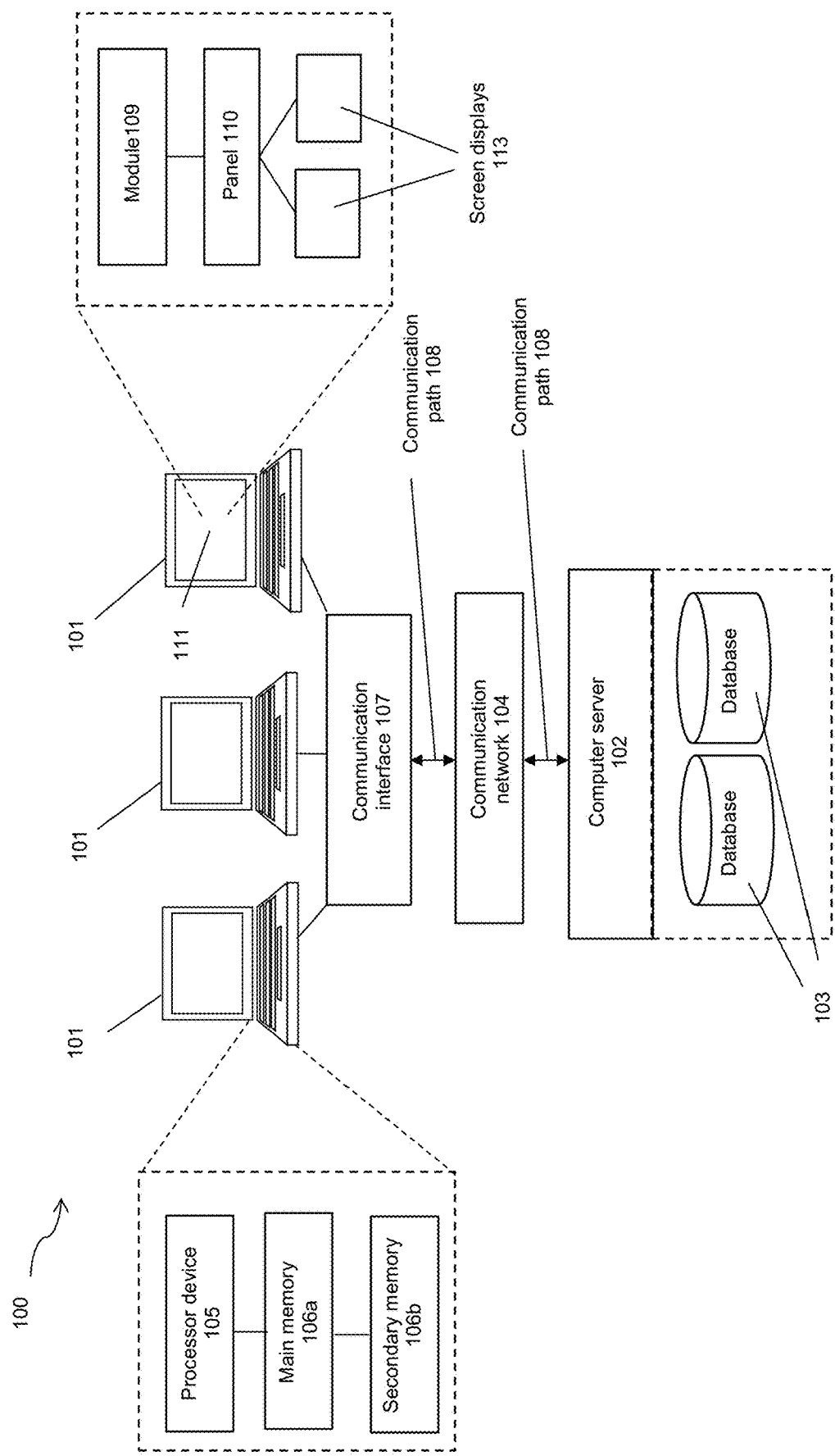
FIG. 2 illustrates a computer network that may be used with the system.

Referring now to FIG. 2, the computer network 100 may include a plurality of computer devices 101, computer servers 102, databases 103, communication networks 104, and communication path/connections 108. A user of the system may use at least one processor device 105, memory storage 106a, 106b, and communications interface 107 to communicate and execute commands Each computer server 102 may be connected to at least one database 103, where application software 30 executed by each computer device 101 may carry out functions of storing, coalescing, configuring, and transmitting data. Application software 30 may be stored on any type of suitable computer-readable medium or media. This may be a non-transitory computer-readable medium or media, such as a magnetic storage medium, optical storage medium, or the like. Possible computer system architectures for the computer network 100 will be discussed later.

The system may include remote control of the various components by the human-in-the-loop. This may be achieved through a system of hard-wired electrical, coaxial cable, and/or optical lines running from the various actuators 20 and sensors 10 to the computer devices (which may or may not be within the control room). Remote control may also include wireless communications via infrared, ultrasonic, radio and/or other electromagnetic wavelengths of light transmissions configured to carry encoded information to execute various functions. For example, a computer device 101 of the control room may communicate via a system of transmitters, receivers, and/or transceivers to actuators 20 and sensors 10 to direct operations thereof (e.g., motor movement of actuators, sensor sensitivity, sensor scan direction, etc.).

The system may operate with secure communications via encryption. For example, a systemic 2048 bit and 4096 bit elliptical curve encryption maybe utilized throughout the computer network 100 to protect from unauthorized take over, disruption of components, or disruption of the system as a whole. This systemic encryption technology may, in part, use microchips supporting the encryption algorithms embedded in components of the system that are configured to transmit data and communicate via a link (e.g., via Ethernet, IP, SCADA, digital automation control systems, etc.). In addition, cyber security switches, such as information and control systems Industrial, Managed, Cyber Protected Ethernet switches, may be used to provide multilayer protection. An example of a switch may include Sensar's Tungsten™ cyber security ethernet switch. Cyber security switches may be configured to monitor the fiber for attack attempts (e.g., hacking, eavesdropping, tampering, etc.) by detecting fiber length change, sudden change in the attenuation, etc., wherein the cyber switch may shut down the link when an attack is detected. Re-establishing the link may require re-enabling the link manually.

Other forms of monitoring and switching may be utilized, as set by a security policy programmed into the system. For example, monitoring may occur at each port so that upon detection of a security breach occurring at any port, or any network elements connected to the port, action may be taken (e.g., creating a log or even isolation of a port). Detection of breaches may be achieved by identification of mute ports, change in cable length, change in fiber attenuation, change in Power over Ethernet (PoE) PD power consumption, etc.

Sensor

Sensors 10 may be used to detect occurrences and collect data regarding the occurrences. Sensor data, actuator data, and/or countermeasure data from the system may be transmitted to a computer device 101, to another sensor 10, and/or to an actuator 20. The transmission may occur through one of the hard-wired or remote transmission schemes described above and/or through any of the communication path/connections 108 of the computer network 101. In addition, some sensors 10 may be connected to the system via a close circuit system configuration.

The sensors 10 include any device that may be used to detect and record characteristics of the environment, which may include light, motion, temperature, pressure, etc. For example, a sensor 10 may be a semiconductor device that changes electrical conductance based upon changes in light, pressure, etc., thereby creating a conditioned switch. Other sensor/switching techniques may be used, which may include, but are not limited to, line of sight sensors, seismic sensors, audio and acoustical sensors, pattern and anomaly recognition sensors, gunshot detection sensors and arrays, radiofrequency phased array radars, etc.

Additional sensors 10 may include Horizontal Surveillance Radar (HSR) sensors with an operating range of up to 360 degree of continuous monitoring and unlimited programmable control zones for areas in size from under 1 acre to over 10 square miles. LIDARS may be employed using anomaly detection analytic algorithms and/or motion detectors, along with other detectors that may sense changes in geometrics of a surveillance area.

Some sensors 10 may be active sensors that emit active frequencies throughout the surveillance area to activate/energize passive transceivers, reflectors, RFID tags, etc. carried by friendly forces (e.g., physical security personnel, responder personnel, etc.). Signals emitted from the passive transceivers are acquisitioned and processed by the system to distinguish and differentiate between adversaries and non-adversaries. For example, passive transceivers may be configured to resonate and excite at frequencies transmitted by the active sensors 10, thereby emit a signal that may be detected by other sensors 10 of the system. With the use of such active sensors 10 and passive transceivers, the system may use signal processing and mapping techniques to identify positions and movements of friendly forces by identifying the friendly forces as those emitting a signature signal from a passive transceiver.

A variety of cameras may also be used as sensors 10, which can be used with imaging recognition software to assist with identification of objects. For example, a camera may be a thermal imaging device, which may use ferroelectric thermal imaging to detect changes in capacitance as a proxy for changes in heat. A pixelated focal plane may be created within the camera to detect the changes in a 2-D array so as to determine a thermal image pattern. Data from the pixelated plane can then be processed, stored, and transmitted in accordance with recognition software as needed. Other cameras may include 3-D object recognition cameras. Such cameras typically employ 3-D recognition software that generates a 3-D image of an object from a 2-D representation using latent vector representation techniques. Other cameras and image capturing techniques may be used, which may include, but are not limited to, thermal RADAR, LIDAR. LADAR, ultrasonic, night vision, etc.

Some embodiments include cameras that emit and detect IR illumination at, and above, 940 nm so as to enable night detection through the camera without emitting an IR beam that is visible to the naked eye. Other cameras may be equipped with special processing capability to generate images during inclement weather, such as range gated imaging, direct time-of-flight imaging, etc. For example, under range sated imaging, a laser source may illuminate the field of vision via pulsed laser light. With the pulsed light and a controlled shuttering of the lens, an image may be generated that is free from reflections that would otherwise be caused due to light-scattering objects in the field of vision (e.g., snow). Other cameras may include explosion and bullet resistant cameras.

The sensors 10 may include rangefinder and position sensors, which may employ laser light and optoelectronics to ascertain a differential exhibited by pulses of light emitted and reflected. The differential may be used to determine position and movement of an object. Rangefinder sensors 10 may be used in conjunction with any of the cameras above to develop a 3-D representation of an area and any objects (e.g., adversary) in real-time, which may be displayed on one of the computer devices 101 via a module 109 and/or panel 110. Other rangefinder and position detection techniques may include radio or microwave RADAR detection.

The sensors 10 may be used in a variety of ways. For example, line of sight sensors 10 may be used in conjunction with, or may be attached to, an actuator 20 to assist with aiming the actuator 20. Seismic and audio sensors 10 may be used to detect sounds or other vibrational occurrences that are indicative of malevolent or suspicious activity. As an example, an audio sensor 10 may be equipped with resonating and excitation circuitry to resonate at a sound symptomatic of a gunshot and transmit a signal to the system when such a sound is detected. Seismic sensors 10 may be similarly configured to detect vibrations indicative of certain types of engines idling in proximity to an area of interest.

A plurality of sensors 10 may be used to generate a collection and correlation of data, which may be used to formulate assessments, via application software 30, to identify a threat and/or the severity of the threat that an occurrence may pose. For example, sensor data detecting three personnel moving in a concerted motion and in a particular formation may be determined to be adversaries, whereby the system servos actuators 20 to generate non-lethal but debilitating countermeasures. However, sensor data detecting three personnel moving about erratically may be determined to be non-hostile trespassers, whereby the system servos audio alerts to inform the personnel that they are trespassers and should exit the premises. In the later situation, the response may also include a brief servo of a laser blinder actuator 20 to intensify the warning. Software 30 to perform such analyses and assessments may be embodied in the automated reasoning engine and/or the logical control software.

In addition to the sensing capabilities of the sensors 10 and the analytics of the software 30, other techniques may be used to assist with detecting, identifying, and localizing threats of occurrences. These may include calibrated smart sensors, sensor fusion, tandem analytics, application programmable interfaces (APIs), etc. The API enables application software 30 of the system, such as the automated reasoning engine for example, to act as a software network platform via application programs and hardware components of the system. Some of these techniques may also be used to enhance the functioning of components of the system under certain conditions. For instance, if inclement weather impedes detection by a certain type of sensor, techniques such as sensor fusion, for example, may enable continued detection by applying predictive statistics to correlated data acquisitioned from other sensors 10.

Actuator

Actuators 20 may be used to execute the countermeasures commanded by the system via application software 30 and/or the human-in-the-loop. Actuators 20 may be in communication with a computer device 101, another actuator 20, and/or a sensor 10 to receive/transmit actuator data, sensor data, and/or countermeasure data from the system. Data transmission and communications between the actuator 20 and components of the system may be achieved in similar fashion as that of sensors 10 described above, including the use of API. Software with control algorithms and decision-making algorithms may process the sensor data and actuator data from the sensor APIs and actuator APIs to actively control the sensors 10 and actuators 20. In this regard, some sensors 10 and actuators 20 include turret assemblies, gimbal assemblies, and the like to enable articulated movement.

Examples of actuators 20 may be devices that emit light, sound, microwave radiation, chemicals, mass objects, etc. in a desired direction with a desired trajectory, which may be procured from companies such as WatchStander® or Precision Remotes®. The actuators 20 are configured to implement countermeasures to threats so the emissions from them should cause disruption, distraction, pain, injury, or even death if necessary. For example, light emitters may include laser dazzlers to emit visible light directed toward humans, causing temporary blindness, or infrared light directed toward sensors and other electronics to disrupt electronic operations that may be employed by the adversaries. Chemical emitters may include tear gas and other pulmonary, nerve, and/or nettle agents. Other emitters may include electromagnetic pulse generators, sonic and ultrasonic generators, water cannons, rubber bullet guns, net guns, foam guns, etc. The effects of the emissions may cause temporary blindness, nausea, vomiting, headaches, hearing loss, subcutaneous pain, seizures, etc.

Other actuators 20 may include remotely and electronically controlled gates, doors, personnel barriers, and other devices that act as passive security obstacles. Some of these may include passive devices that are already part of an existing passive physical system, as the defense and denial system may be used to augment passive physical systems (whether they are already installed or installed concurrently with the defense and denial system).

The coordinated responses administered by the actuators 20 are a countermeasure used to mitigate damage posed by the occurrence and/or extinguish the threat posed by the occurrence. A countermeasure may include an active measure taken in preparation of a predicted occurrence, thus countermeasures are not limited to merely responses to an event. For instance, learned scenarios may inform the system that if a particular countermeasure is administered then the adversaries would attempt to perform certain defensive acts; therefore, the system would automatically servo additional actuators in preparation. Thus, generating a countermeasure may include a concerted triggering of a plurality of actuators 20 to generate a certain result.

Different sequences and combinations of actuator response-intensity and response-rate can be used based on the circumstances, as determined by the application software 30 and/or the human-in-the-loop. The actuators 20 may work independently or in a coordinated fashion in this regard. The resultant effect on an adversary may be to overwhelm his senses of sight, sound, and touch at least until physical security arrives to engage the adversary. For example, a countermeasure may include actuation of a microwave actuator 20 to produce a burning sensation moments before actuation of a laser dazzler actuator 20, which may be followed by an ultrasonic emission so that the adversary experiences a certain psycho-physiological sensation.

Nonlethal actuators 20 may act upon the adversary to not only suppress adversary, but to also disrupt the adversary's movements and thwart his objective. Thus, the system not only delays the adversary sufficiently to generate much needed time for physical security and response personnel to engage, but also thwarts an attack completely without the need for lethal force. Sensors 10 and actuators 20 may be positioned to detect and act upon an adversary well before the adversary comes into contact with the perimeter of the physical area.

Application Software

The application software 30 may include an automated reasoning engine, logical control software, and/or other software (e.g., interfacing software, target acquisition software, etc.). The automated reasoning engine employs artificial intelligence and machine learning to automatically generate countermeasures and execute responses. Logical control software employs decision-making algorithms to implement sequences in accordance with countermeasures, but without automatic execution of the response. The system may use any combination of the software described above to achieve the range of automation desired.

Automated Reasoning Engine

Figure 3:
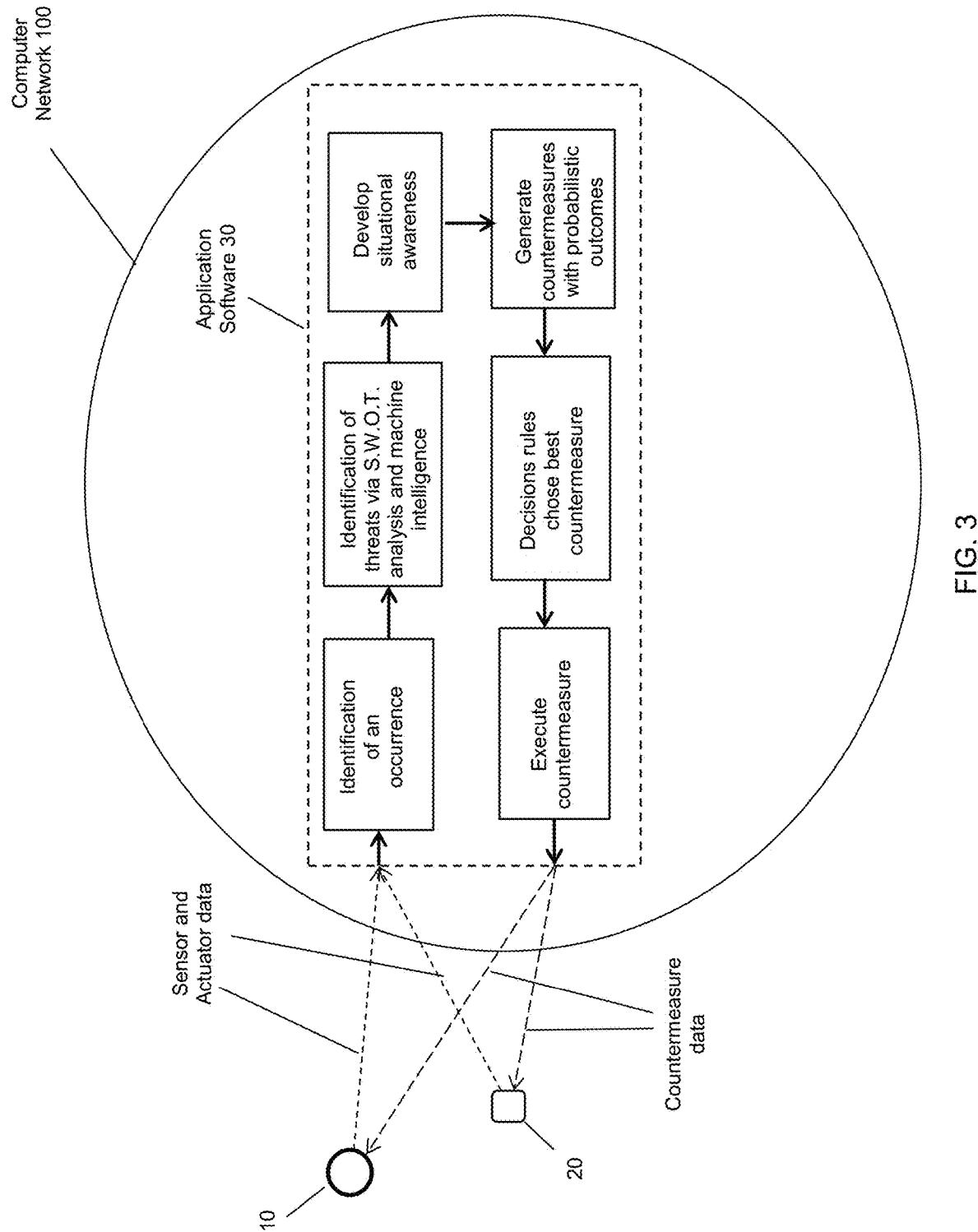
FIG. 3 is a block diagram of decision steps that may be taken by the application software.

Referring to FIG. 3, the automated reasoning engine is software enabling automation of system components to generate countermeasures that analyze and adaptively respond to the occurrence. A synergistic integration of sensors 10 identifies the occurrence, where an immediate S.W.O.T. (strengths, weaknesses, opportunities, and threats) type analysis is performed to localize potential threats posed by the occurrence. A feedback loop implemented by the automated reasoning engine (see FIG. 5B) uses sensor data and actuator data to adaptively generate countermeasures in real-time and/or by pre-programmed commands to execute automated responses that are orchestrated and adaptive to real-time changes.

Machine intelligence may be used to identify and localize the threats posed by an occurrence so that countermeasures may be generated to minimize damages. Threats are determined by modeling and analyzing sensor and actuator data to ascertain the potential risk posed by the occurrence. If the occurrence generates a risk factor that is above a threshold, then it may be categorized as a threat. For instance, an occurrence may be a tree limb that fell that has been detected by the system. Because no heat signature is recorded (e.g., infrared sensors), no further movement is detected (e.g., motion sensors), no weapon is detected (e.g., reflected RADAR frequencies), and no explosive material is detected (e.g., chemical, radiological, etc. sensors), the system may not classify this occurrence as a threat. As another example, an occurrence may be a person walking along a street near the perimeter, which may not be classified as a threat if the person continues to walk. If the person stops for a period of time along the fence of the perimeter, that occurrence may then be classified as a threat that warrants an audible warning emitted from an actuator 20. If the person continues to positing himself next to the fence even after the warning, the threat may be elevated to warrant an enhanced countermeasure.

Interaction of system components and a possible response may be exemplified with the following two scenarios occurring to an electric power transmission substation situated at a relative low point in a rural river valley characterized by rolling hills and uneven terrain. Each scenario includes a situation where the vegetation in the area immediately surrounding the substation is limited to short grass, a 300 meter long driveway exists leading down to the north side of the substation from a secondary roadway to the north, the time is midafternoon, and there is no one present at the substation which is in secure mode.

Under a first scenario, a hunter approaches the vicinity of the substation on foot proceeding from East to West along the north-side of the substation. Thermal camera sensors equipped with video analytics and RF phased array radar sensors detect this activity, and the defense and denial system classifies the hunter as the lowest level of threat by which he is placed under active observation. At this stage, a security video management system (VMS) reports the threat to security control via a VMS GUI for observation (which may be part of the command and control GUI 60—see FIGS. 8A and 8B). Thermal camera sensors equipped with video analytics and the RF phased array radar sensors continue reporting to an intelligent coordinator (IC) the hunter's relative position to the substation, and once the hunter has progressed to within 300 meters of the substation (or other predetermined distance), the defense and denial system reclassifies the hunter as a medium threat and the security VMS reports this threat increase to security control via the VMS GUI for observation where the security control room personnel determine the hunter is carrying a large caliber rifle.

The hunter then fires a single round at a deer and within one to two seconds the defense and denial integrated audio analytics gunshot detection system sensor geo-locates the rifle's muzzle blast and simultaneously determines the trajectory of the bullet reporting this information to the IC. Based on the trajectory of the bullet, the IC maintains classification of the hunter at the medium threat level as a there is no apparent malevolent intent to cause damage to the substation.

In accordance with rules of engagement policy (via decision rules programmed into the application software), the IC directs an on-site defense and denial system integrated actuator, equipped with a 12 million fc spotlight, a laser-dazzler, and LRAD to send a recorded safety advisory message to the hunter at a volume level that is adjusted for the distance to the hunter, so that the message reaches the hunter in a clearly audible state, but not so loud as to startle the hunter. The safety advisory message urges safe hunting practices, including to avoid trajectories that would risk bullets striking substation infrastructure.

Under the second scenario, an adversary approaches the vicinity of the substation on foot proceeding from East to West along the north-side of the substation. Thermal camera sensors equipped with video analytics and RF phased array radar sensors detect this activity, where the defense and denial system classifies the adversary as the lowest level of threat and places him under active observation. At this stage, the VMS reports the threat to security control via the VMS GUI for observation. Thermal cameras sensors equipped with video analytics and the RF phased array radar sensors continue reporting to the IC the adversary's relative position to the substation, and once the adversary has progressed to within 300 meters of the substation (or other predetermined distance) the defense and denial system reclassifies the adversary as a medium threat and the VMS reports this threat increase to security control via the VMS GUI for observation where the security control room personnel determine the adversary is carrying a large caliber rifle.

The adversary begins running towards the substation and after coming within, for example, 100 meters of the substation assumes a prone position with a rifle pointing at the substation. Based on the speed of the adversary and the he is closing the distance between him and the substation, the IC reclassifies him at a medium high threat level. The adversary then fires a single round at the substation infrastructure (transformer cooling oil reservoir), and the within one to two seconds the defense and denial system integrated audio analytics gunshot detection system sensor geo-locates the rifle's muzzle blast and simultaneously determines the trajectory of the bullet reporting this information to the IC. Based on the trajectory of the bullet, the IC reclassifies the adversary at the highest threat level and as a sniper engaged in the act of shooting with intent to cause damage to the substation.

To immediately distract the sniper and degrade his ability to accurately shoot at the protected site, the IC directs an on-site defense and denial system integrated actuator, equipped with a 12 million fc spotlight, a laser-dazzler and LRAD to engage the sniper by first sending a recorded sound of an explosive followed by a brief flash of the 12 million fc spotlight approximately ¼ second later so that both reach the sniper simultaneously. The sniper is temporarily debilitated and does not fire a subsequent round.

To further debilitate, distract, and delay the sniper and degrade his ability to accurately shoot at the protected site, the IC directs an on-site defense and denial integrated actuator, equipped with a 12-million fc spotlight, a laser-dazzler and LRAD to reengage the sniper by firing the laser-dazzler to temporarily blind the sniper and project a recorded high decibel level wailing sound simultaneously at the sniper, which should cause the sniper to disengage and depart.

Machine intelligence may also be used to differentiate between an adversaries and non-adversaries so that countermeasures may servo actuators 20 to target and act upon the adversaries, but not non-adversaries (e.g., blue forces). A non-adversary may be detected with the use of active sensors 10 that emit active frequencies throughout the detection coverage area to energize passive transceivers or reflectors carried by the non-adversaries, thereby differentiating them from adversaries and protecting them from being engaged an actuator 20.

Upon identifying threats and non-threats, the system develops a situational awareness by which countermeasures are generated. Prioritization of threats and probabilistic outcomes are factored by the automated reasoning software. Countermeasures may be generated to influence the observation, orientation, decision-making, and action loop of the adversary during an attack. This may include disrupting the adversary's maneuvers by overpowering, distracting, and/or suppressing the adversary. While one of the main operating parameters of the automated reasoning engine is to generate countermeasures to cause delay so that physical security and responding personnel are afforded extra time to arrive, any disruption of the intended operation of the adversary that undermines the adversary's ability to attain an objective and provides physical security personnel with added advantages when they arrive may be employed.

For example, the automated reasoning engine may be programmed to generate a countermeasure to suppress movement in one direction but encourage movement in another direction so as to force the adversary to seek harbor in an area where they pose the least threat of exacting damage to the physical asset. Once the physical security personnel arrive, the system may adaptively change to generate countermeasures that again force the adversaries to seek harbor in an area such that the physical security personnel has the tactical and/or strategic advantage upon engaging them. Such concerted action by the system would be dependent on the situational awareness continually updated via the feedback loop.

Decision rules are programmed into the software 30 to determine when an occurrence warrants generation of a countermeasure and which type of countermeasure to generate. When applied by the system, the decision rules factor parameters and variables derived from the situational awareness analyses, contingency analyses, max-min damage analyses related to the physical asset/area and collateral assets, cost-benefit analyses of taking action/no-action, etc. Decision rules may invoke tactics, such as servo of one set of actuators 20 to force the adversary to move to different locations where the effectiveness of a second set of actuators 20 is increased or the vulnerability adversary attack is lessened.

Decision rules may also be used for programming the system for purposes of safety and compliance with rules of engagement. For example, the software 30 may be programmed so that the actuators 20, when aimed in the direction of adversaries who are between the actuators 20 and a roadway, may not fire at the adversaries if the trajectory of the beams is in line with the passing motorists. Other examples of decision rules could include how the actuators 20 might engage multiple targets efficiently by factoring the threat presented by each individual adversary and modifying actuator target engagement behavior accordingly through the continuous feedback loop. The continuous feedback loop of information from the sensors 10 and actuators 20, along with the continuous process flow of FIG. 3, immediately determines which countermeasures are having the most desirable effect in a given fluid situation and adapt accordingly.

The decision rules could be encoded using constraint production rules of the form: IF target is INLINE with motorway THEN INHIBIT firing. Where INLINE is a constraint set on the possible target locations and INHIBIT is a constraint on the firing action. Another rule might be of the form: IF target is CLOSE to a critical asset THEN threat level is HIGH. Where CLOSE is a constraint on the relative location of the target and HIGH is a constraint on threat level. A hierarchical set of these constraint production rules can then be resolved using one of several well-known multi-attribute decision making algorithms to produce the decision rules.

Figure 4A:
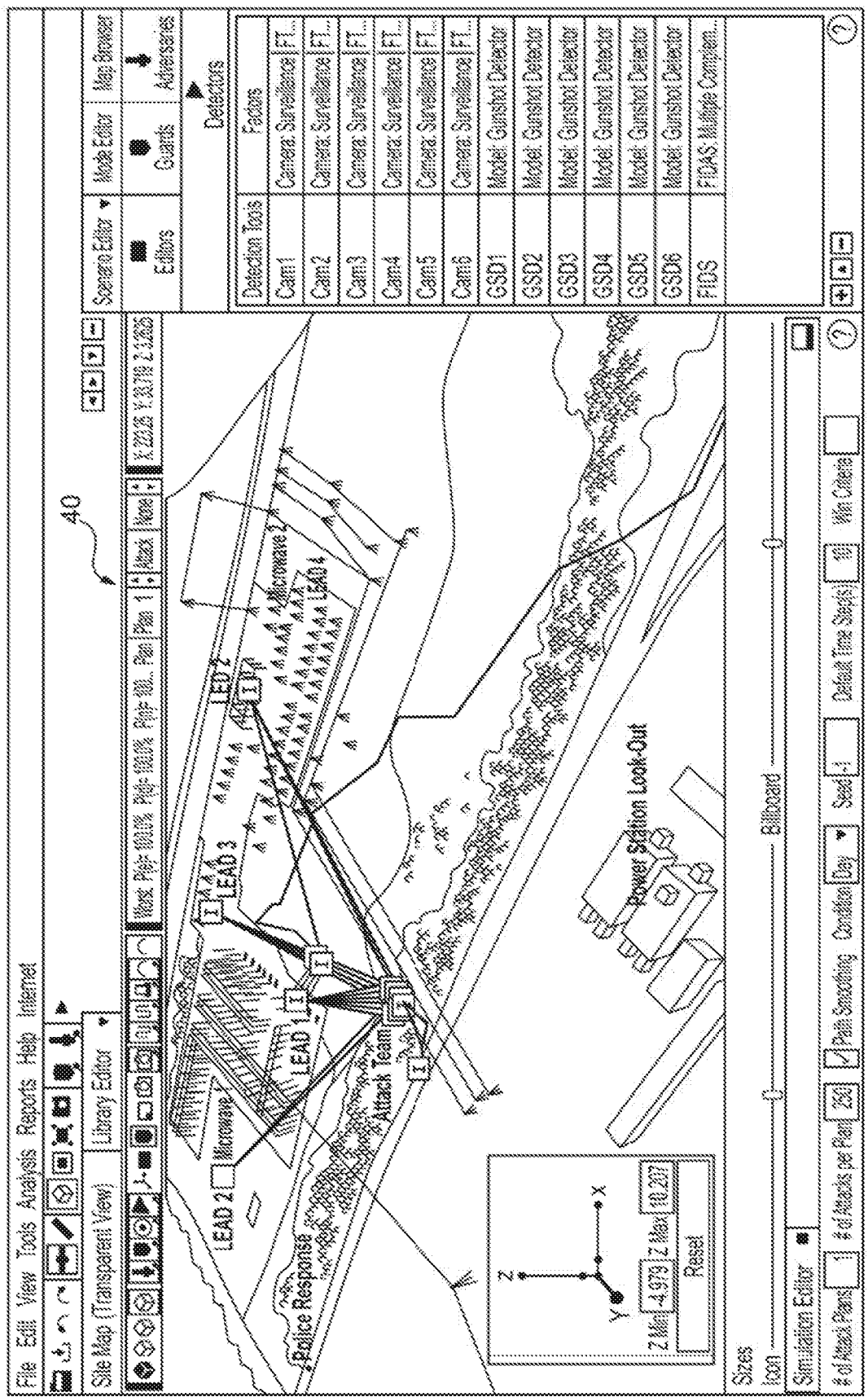
FIGS. 4A and 4B are displays of a simulated model that may be generated by the system based on decision rules.
Figure 4B:
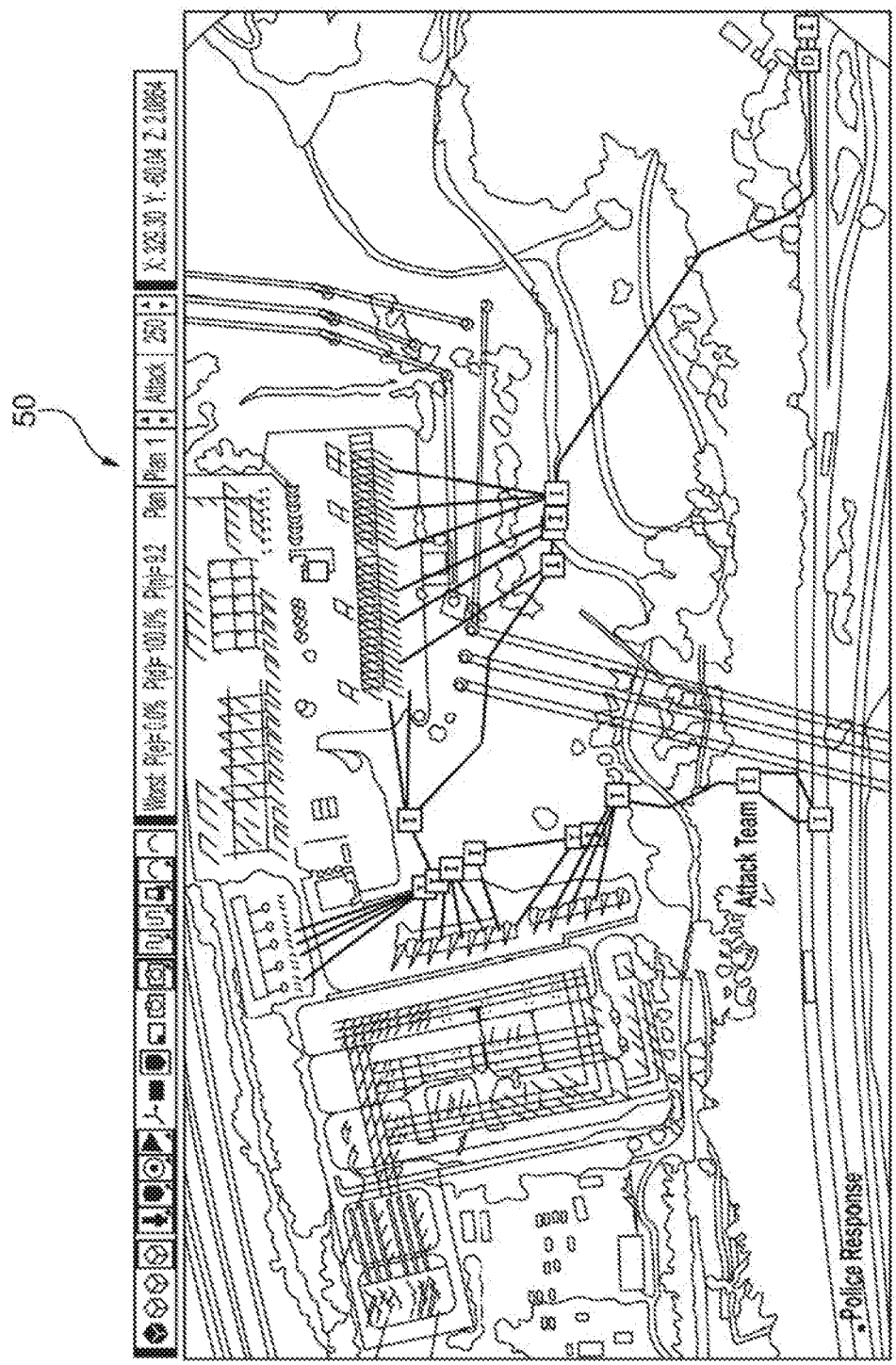

Referring now to FIGS. 4A and 4B, a simulated model that may be generated by the system based on decision rules, is disclosed. The decision rules may be programmed to be dependent on the area/asset to be protected and the expected occurrences to which the area/asset would be exposed in order to define threats of occurrences. This may be achieved by associating the threats with a context via context factors. The context factors may include, but are not limited to, political, environmental, technological, and social factors. Political factors may include legal limits of using a countermeasure, the type of area/asset, and the level of response permitted by law protect the area/asset or other asset. Environmental factors may include the topography of the protection site, geography of the area, whether it is daytime or nighttime, collateral damage that may occur to the area/asset or other asset. The technological factors may include the limitations of the actuators 20 and sensors 10, the availability of physical security, constraints imposed by the capabilities of physical security and responder personnel, etc. The social factors may include the propensity to cause inadvertent damage to others, the proximity to populated areas, etc. The results may be displayed via the context factors GUI 40 shown in FIG. 4A. The automated reasoning and other intelligent software programming is then written and implemented based on the decision rules. For instance, a context factor may be programmed into the decision rules to prevent servo of a microwave emitter actuator 20 that, if actuated, may extend beyond a predefined perimeter, regardless of the effect of minimizing the damage posed by the occurrence may have.

The decision rules form a hierarchical set of constraints on the decision space. The constraints are normalized as goals. An inhibitory constraint is normalized so that inhibition is the logical inverse of allowance. An inhibition has a low degree of allowance. A goal has a high degree of allowance. Decision-making includes aggregating the allowance of all the constraints (goals and inhibitions) and then searching for the regions of the decision space with the highest degree of allowance. These then become the decision set. For example, suppose a targeting rule produces a constraint of the form target is at location X with precision Y. This places a precise constraint on the allowed firing solution for a firing decision. Another constraint is of the form. If clear line of sight from actuator to target. To create the clear line of sight constraint inhibitory constraints for all obstacles that might intersect a line from the actuator to the target can be applied to determine the allowance of clear line of sight.

In accordance with the second scenario described above, the following is an example demonstrating the use of the decision rules to generate a decision feedback loop for the defense and denial system. Under the second scenario, the adversary is a terrorist sniper with insider knowledge of the facility attacking the facility, using stealth and force to inflict incapacitating damage on the substation. Such a scenario may fit within THREAT #1 using the Design Basis Threat analysis (see FIG. 10), which will be described in more detail below.

Progression of Events

1. The adversary is walking parallel to the north-side fence line of the substation proceeding from East to West. The adversary's path is more than 300 meters away from the fence (or other predetermined distance).

Detection and Classification

RF phased array radar sensors may produce a radar-motion-detected event, where the radar provides range, bearing, velocity, and target size. The location of the target may be calculated from the range and bearing relative to the radar antenna location and orientation.

Thermal imaging camera sensors may also produce a thermal-object detected event. The thermal imaging camera detection software may be pre-calibrated by registering existing objects in the field of view. Subsequent scans may compare currently detected objects with preregistered objects. Any new objects detected may trigger a thermal-object-detected-event. The thermal imaging camera sensors may provide range, bearing, size and characterization of target. The location of the target may be calculated from the range and bearing relative to the thermal camera sensor's location and orientation. Classification software associated with the thermal camera may classify the objects as human, dog, car, etc. At close range, the classification software can also determine if a human is standing, sitting, or lying down. At very close range, the classification software can also perform facial recognition on a human target.

Gunshot detection system sensors may produce a gunshot detected event, where software can detect and locate the location where the gunshot occurred and the direction of the shot from the acoustic shock wave.

Decision Rules

If radar-motion-detected event with location FAR to fence and HUMAN (velocity, size, etc.), then fire human-far-outside-fence event.

If thermal-object-detected event with location FAR to fence and HUMAN object, then fire human-far-outside-fence event.

FAR is defined as an interval (crisp, fuzzy, or probabilistic) between 300 meters and 500 meters beyond the fence (or other predetermined distance).

If collocated thermal and radar generated human-far-outside-fence events, then fire very low-level-threat event.

If very low-level-threat event, then respond by notifying security management with details of very low-level-threat event and servo high resolution camera sensors to location of threat.

Figure 8A:
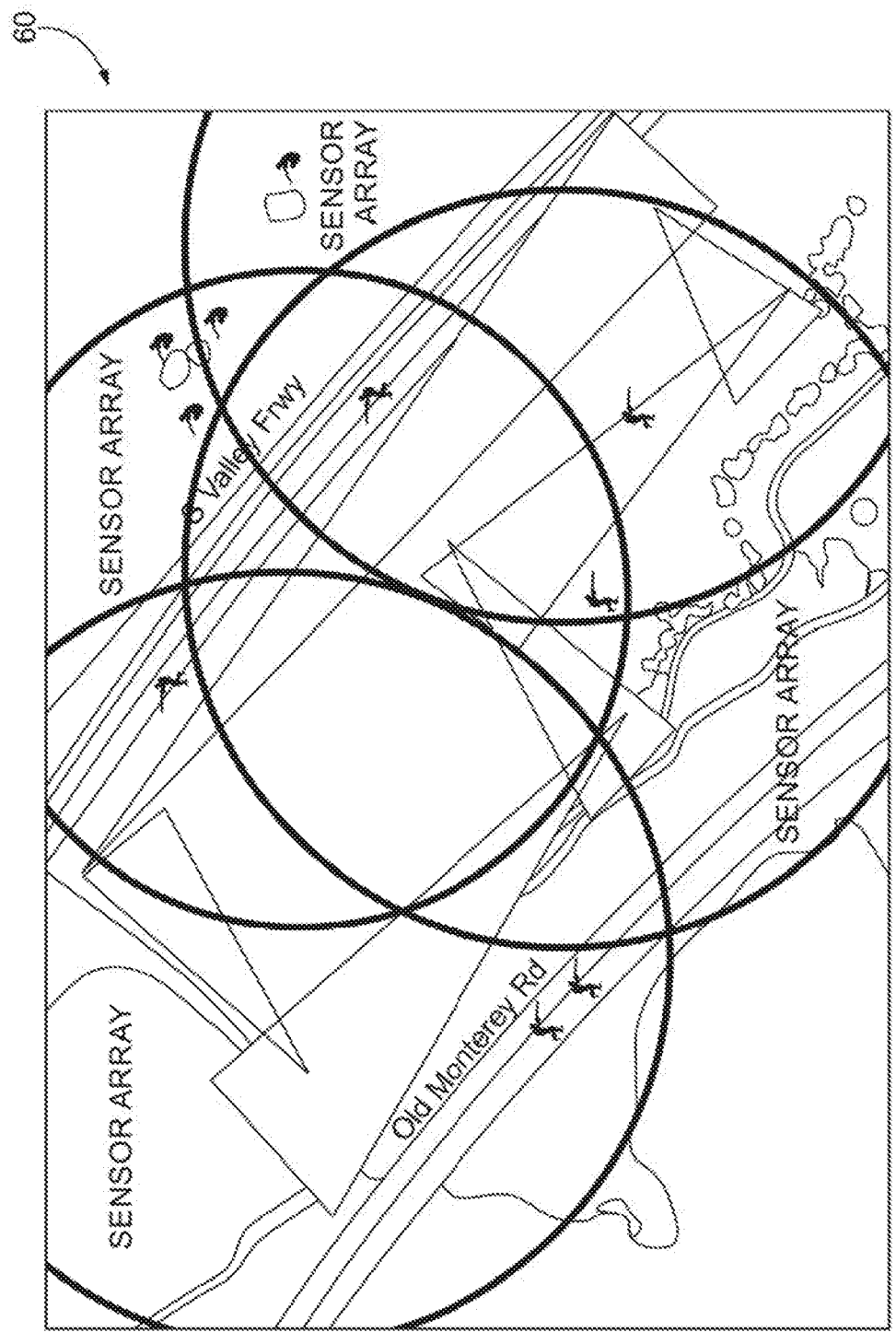
FIGS. 8A and 8B show a multi-phenomenology sensor array display that may be established by the system, and a display demonstrating coordinated actions of components of the system to thwart an attack, respectively.
Figure 8B:
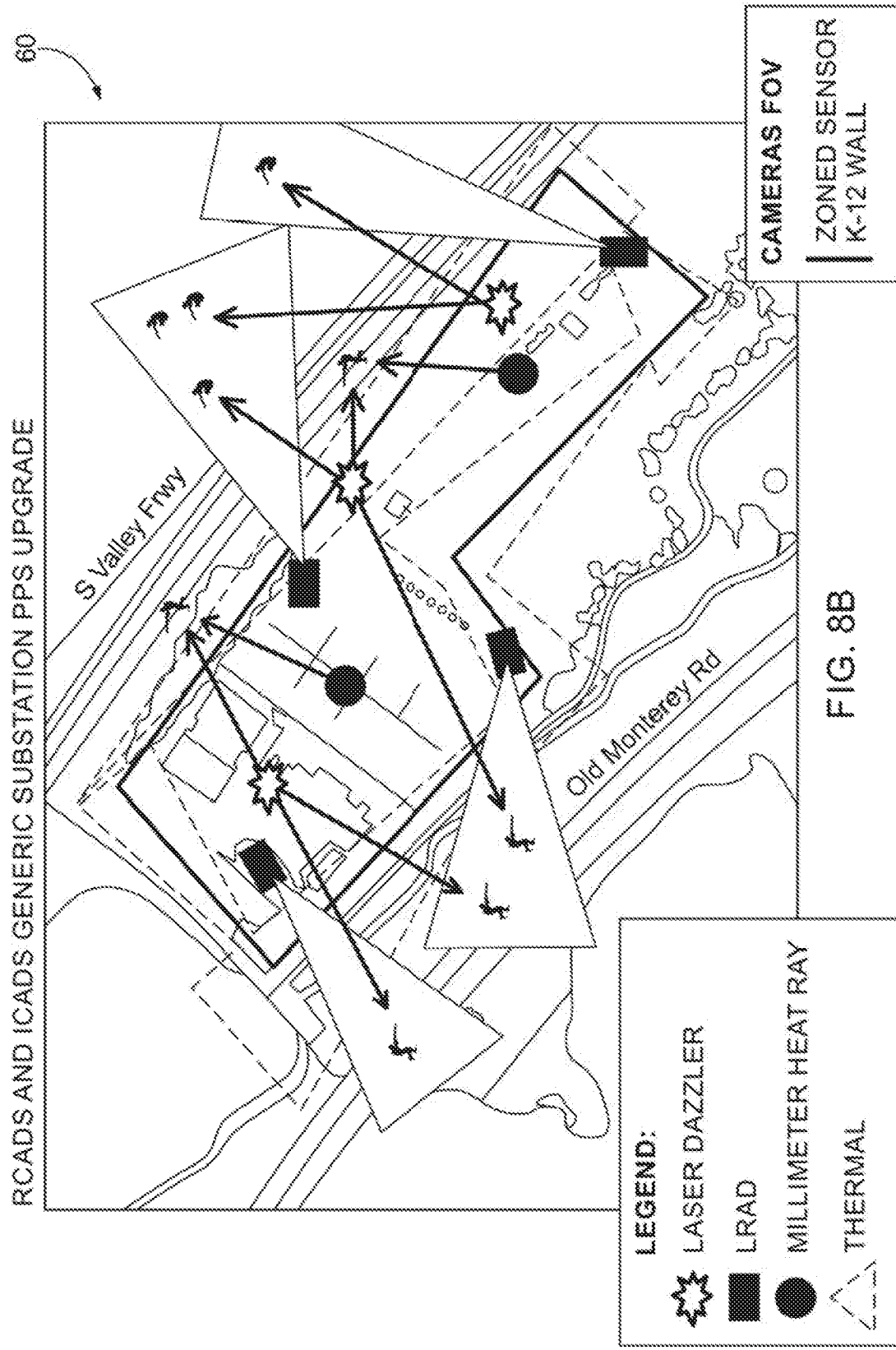

Upon receipt of the very low-level-threat event, the security management system software may display the radar, thermal, and high resolution camera images on command and control GUIs 60 (see FIGS. 8A and 8B). The security control room personnel may be required to observe low-level-threat events.

2. The adversary turns walks towards the north fence until the adversary is less than 300 meters from the fence (or other predetermined distance).

Decision Rules

If radar-motion-detected event with location MEDIUM to fence and human (velocity, size, etc.), then fire human-medium-outside-fence event.

If thermal-object-detected event with location MEDIUM to fence and human object, then fire human-medium-outside-fence event.

MEDIUM is defined as an interval (crisp, fuzzy, or probabilistic) between 100 meters and 300 meters beyond the fence (or other predetermined distance).

If collocated thermal and radar generated human-medium-outside-fence events, then fire low-level-threat event.

If low-level-threat event, then respond by notifying security management with details of low-level-threat event and servo high resolution cameras to location of threat.

Upon receipt of the low-level-threat-event, the security management system software may display the radar, thermal, and high resolution camera images on the command and control GUIs 60. The security control room personnel may be required to monitor low-level-threat events.

3. The adversary runs towards the substation and, after coming within 100 meters of the substation (or other predetermined distance), assumes a prone position with a rifle pointing at the substation.

Decision Rules

If radar-motion-detected event with location NEAR fence and human (velocity, size, etc.), then fire human-near-outside-fence event.

If radar-motion-detected event with location NEAR fence and human (velocity, size, etc.) and velocity TOWARDS fence, then fire human-approach-outside-fence event.

If thermal-object-detected event with location NEAR fence and human object prone, then fire human-near-outside-fence event and fire human-prone event.

NEAR is defined as an interval (crisp, fuzzy, or probabilistic) between 100 meters and 300 meters beyond the fence (or other predetermined distance).

If collocated thermal and radar generated human-near-outside-fence events and (human-near-approach-outside-fence event or human-prone-outside-fence event), then fire medium-level-threat event.

If medium-level-threat event, then respond by notifying security management with details of medium-level-threat event and servo high resolution cameras to location of threat, Also broadcast audible warning to adversary to move away from the fence.

Upon receipt of the medium-level-threat-event the security management system software may display the radar, thermal, and high resolution camera images on the command and control GUIs 60. The security management system software may also sound an audible alarm in the control room. The security control room personnel may be required to monitor medium-level-threat events.

4. The adversary then fires a single round at the substation infrastructure.

Decision Rules

If radar-motion-detected event with location NEAR fence and human (velocity, size, etc.), then fire human-near-outside-fence event.

If thermal-object-detected event with location NEAR fence and human object prone, then fire human-near-outside-fence event and fire human-prone event.

If gunshot detected event with location NEAR fence, then fire gunshot-near-outside-fence event.

NEAR is defined as an interval (crisp, fuzzy, or probabilistic) between 100 meters and 300 meters beyond the fence (or other predetermined distance).

If collocated human-near-outside-fence events and gunshot-near-outside-fence events, then fire high-level-threat event.

If high-level-threat event with gunshot directed at infrastructure, then respond by notifying security management with details of high-level-threat event and servo high resolution cameras to location of threat. Also servo the 12 million fc spotlight, laser-dazzler and LRAD to point at the location of the target.

If auto-fire is enabled, Then fire the spotlight, laser-dazzler, and LRAD at the target.

Upon receipt of the high-level-threat-event the security management system software may display the radar, thermal, and high resolution camera images on the command and control GUIs 60. The security management system software may also sound an audible alarm in the control room. The security management software may also display the targeting solutions. The security control room personnel may be required to monitor high-level-threat events. If auto-fire is disabled, then the security personnel can manually enable auto-fire.

5. The sniper begins moving away from fence.
Decision Rules

If radar-motion-detected event with location NEAR fence and human (velocity, size, etc.), then fire human-near-outside-fence event.

If radar-motion-detected event with location NEAR fence and human (velocity, size, etc.) and velocity AWAY from fence, then fire human-depart-outside-fence event.

If thermal-object-detected event with location NEAR fence and human object standing, then fire human-near-outside-fence event and fire human-standing event.

If collocated thermal and radar generated human-near-outside-fence events and human-near-depart-outside-fence event and human-standing-outside-fence event, then fire medium-level-threat event.

If medium-level-threat event, then respond by notifying security management with details of medium-level-threat event and servo high resolution cameras to location of threat. Also broadcast audible warning to adversary to move away from the fence.

Upon receipt of the medium-level-threat-event the security management system software may display the radar, thermal, and high resolution camera images on the command and control GUIs 60. The security management system software may also sound an audible alarm in the control room. The security control room personnel may be required to monitor medium-level-threat events.

6. The sniper departs.
Decision Rules

If no motion-detected events, then fire no-level-threat event.

If no-level-threat event, then restore sensors to no-level-threat setting.

Upon receipt of the no-level-threat-event, the security management system software may display the there are no current threats.

Various statistical and probabilistic techniques and methods are incorporated into the automated reasoning engine. These may include, but are not limited to, fuzzy logic, artificial neural networks, Baysian reasoning, elastic constraint propagation, multi-objective and multi-attribute decision-making, simultaneous localization and mapping, Kalman filtering, etc. With the use of any of the above techniques, the automated reasoning engine weighs stored contingencies (e.g., 80% of scenario A is occurring right now, 10% of scenario B is occurring right now, there is a 20% change that scenario D will occur if countermeasure "x" and "y" are executed, etc.), and uses predictive statistical analytics to develop outcomes with probabilistic weights to variables (e.g., context factors). Proposed countermeasures are generated based on these outcomes, by which failure analysis modeling may be used to generate countermeasures with desired, or at least acceptable, responses. The outcomes can be displayed via the proposed countermeasures GUI 50 shown in FIG. 4B.

An example of a predictive statistical analytic may be generation of mathematically modeled scenario profiles for the learned scenarios (e.g., scenario A, scenario B, etc.). As an occurrence ensues, the collection of sensor 10 data may generate a mathematical model of the current occurrence. This current occurrence model may be generated iteratively to produce a current occurrence profile. The current occurrence profile may then be compared to the modeled scenario profiles in a statistical manner to develop correlations, relationships, leading and lagging indicators, etc. to quantify the percentage of a given learned scenario that the current occurrence is following. The system may then use analytics, via the automated reasoning engine for example, to determine the best countermeasure. The resultant current occurrence profile and modeled learned scenario profiles may be displayed on the context factor and proposed countermeasure GUIs 40, 50.

These, and other GUIs, may be displayed on screen displays 113 of computer devices 101 via modules 109 and panels 110. A module 109 may comprise a plurality of panels 109 to display data and GUIs in a hierarchical manner. For example, a first module 109 may be programmed to display simulation and modeling GUIs via a plurality of first panels 110. A second module 109 may be programmed to display command and control GUIs 60 (see FIGS. 8A and 8B) via a plurality of second panels 110. Other modules 109 and panels 110 may be programmed to display camera feeds, statistical data about components, information about cyber security switches, etc.

One method for developing effective decision rules to improve the performance of the automated reasoning engine is to export results of simulation and modeling exhaustive multi-scenario report that may be created during the designing the defense and denial system (see the Physical Protection System Design phase of utilizing the system below). Additional response tactics and attack scenarios that occur, and for which have not been previously modeled (i.e., have not be inputted as learned scenarios), may be used to run additional simulation and modeling scenario reports to update decision rules. Such updates are used to improve the performance of the system via the automated reasoning engine.

A human-in-the-loop may enabled/disable a capability of any component of the system before, during, and/or after an occurrence is detected. For instance, a user may prevent actuation of a particular actuator 20 that may otherwise be programmed to servo under a countermeasure, or even prevent the system from carrying out a countermeasure. In other embodiments, the user may be able to select from a plurality of countermeasures or even build and store countermeasures, which may be performed prior to detection of an occurrence and/or upon detection of an occurrence.

A command and control GUI 60 may be displayed through which a human-in-the-loop may control a component of the system by transmitting and/or interrupting countermeasure data (see FIG. 8B). The command and control GUI 60 may be programmed so that each component depicted in the GUI as an icon is also a user interface.

Activating an icon allows the human-in-the-loop to selectively interact with the countermeasure process. For example, a human-in-the-loop may determine which component to activate/deactivate, discontinued, repeated, etc.

Activation of an icon may be achieved via use of a peripheral device, such as a computer mouse, a gaming style handheld computer controller, a keyboard, etc. to control movement of a cursor on the GUI 60 screen. A component may be activated by hovering the cursor over its representative icon and activating the icon. In addition, or in the alternative, the icon GUI may be programmed to display an options box upon activation of the icon GUI 60, which may display a list of interactive activities from which to choose. In addition, or in the alternatively, a drag-and-drop function may be used to enable dragging a component overtop another component and/or adversary to activate the component in relation to the component/adversary it has been dragged over. For example, dragging an actuator over an adversary may cause that actuator 20 to servo in the direction of the adversary. Other interactive interfaces and GUIs may be utilized, which may be programmable and reprogrammable so as to enable customization of the GUI at the discretion of the user.

It should be noted that a user enabling/disabling an actuator and/or countermeasure need not disable the automated reasoning engine, but rather the user interaction may act to selectively and/or temporarily interrupt countermeasure data transmitted by the automated reasoning engine. In this regard, the automated reasoning engine continues to operate and generate countermeasures in accordance with the decision rules. Furthermore, the automated reasoning and/or logical control software continues to assist the human-in-the-loop, even if there is a temporary interruption of transmitting countermeasure data, to acquire targets by automatically directing actuators at targets. For example, upon detection of gun fire, countermeasure actuators may be pointed at the location of the exact origin of the gun fire, even if a user disables automatic firing of the actuator 20 by the system, because the application software 30 is continuing to localize the range and bearing of the gun fire. Onboard target acquisition software, in conjunction with the automated reasoning and/or logical control software, may drive the actuator 20 to reacquire targeting the adversary as they move about and/or if additional gun fire is detected at a different location.

Figure 5A:
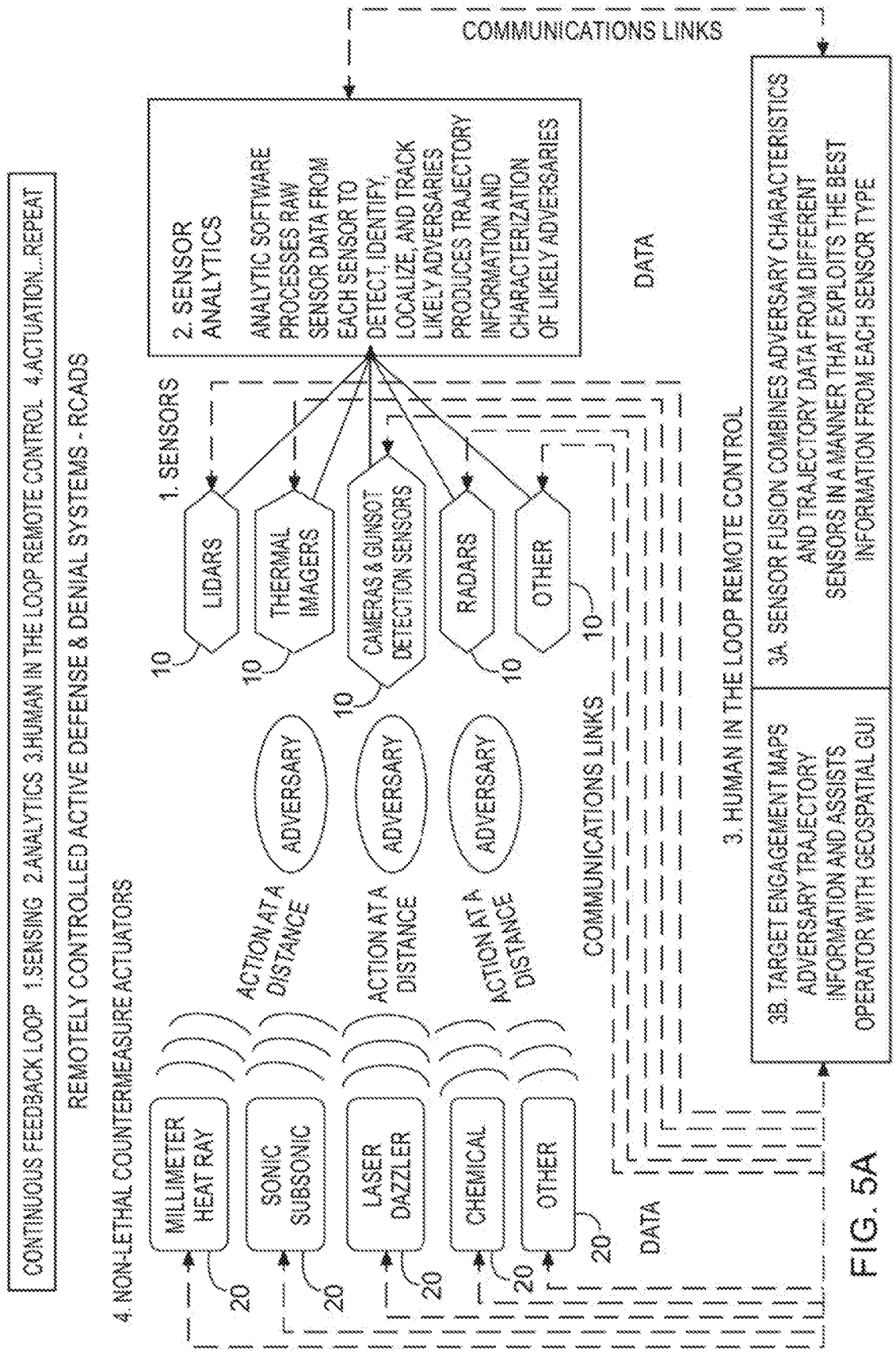
FIGS. 5A and 5B are flow diagrams of continuous feedback loops for a version using logical control software and a version using automated reasoning software, respectively, that may be used with the system.
Figure 5B:
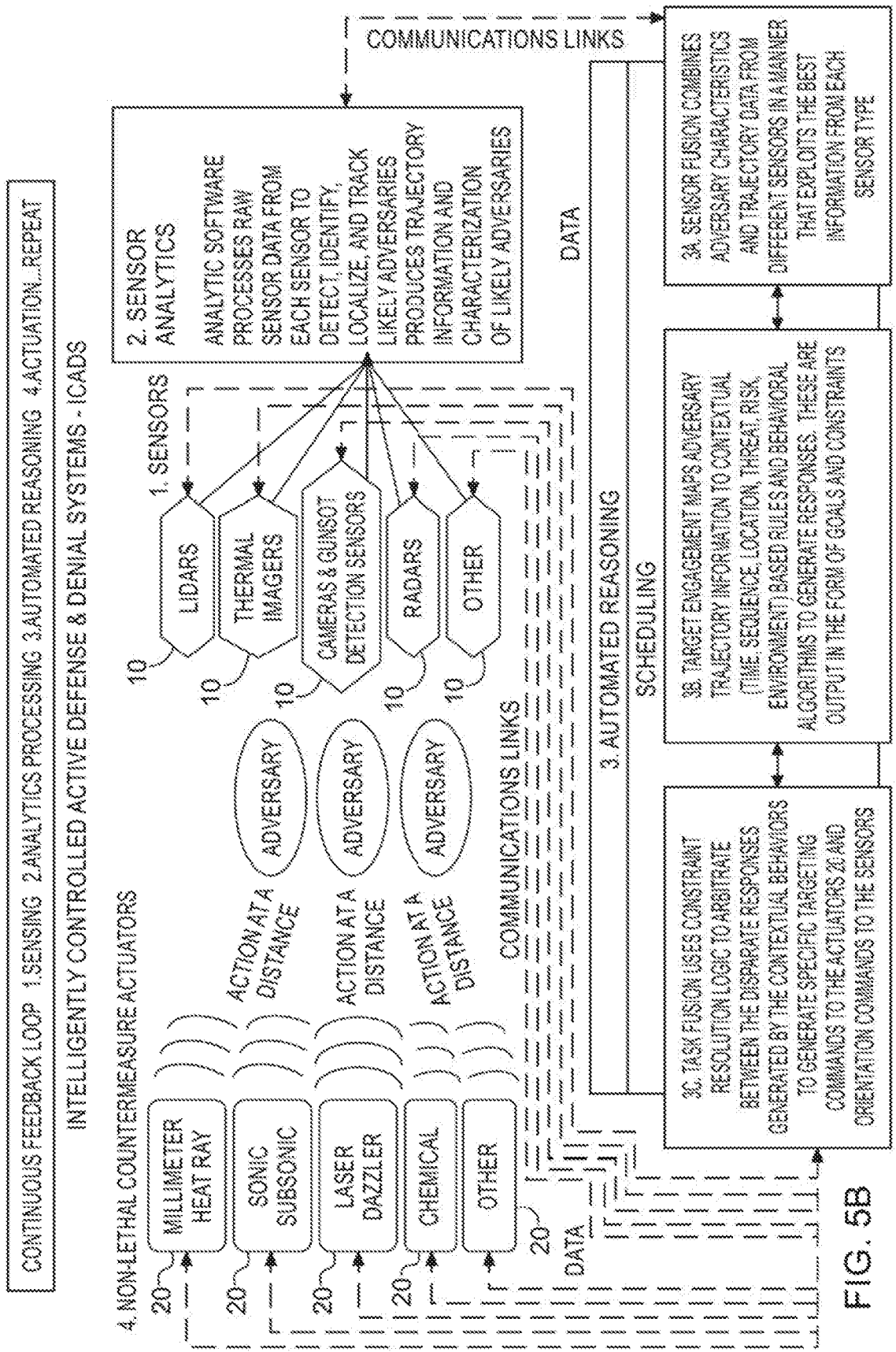

The software 30 is programmed to generate a dynamic continuous feedback loop with the components of the system, adapting to occurrences as they develop in real-time (see FIGS. 5A and 5B). The dynamic feedback may include a loop that may continuously iterate the steps of sensing, analytic processing, actuation and/or human-in-the-loop control followed by actuation. The continuous feedback loop and the continuous process flow of FIG. 3 rate and rank threats to generate countermeasures that are implement automatically and/or presented to the human-in-the-loop via the GUIs 40, 50, 60. In this regard, countermeasures not only are chosen to minimize damage, but also to enable generation of a response with degrees of impact-severity. Because countermeasures may be generated with statistical weights assigned to probable outcomes, guidance and oversight can be provided by humans as control inputs upon presentation of the countermeasure on the screen displays 113. The control inputs may enhance performance of the system by enabling real-time adjustment of priorities and/or enable overriding certain actions by the human-in-the-loop.

Sensor and actuator data are acquisitioned through the APIs of the sensors 10 and actuators 20 so that operating parameters, such as time constants, update rates, and characteristic data of the sensors 10, for example, can be dynamically adjusted based on the circumstances. For example, the range, resolution, and scan rate of a sensor 10 can be adjusted to provide better accuracy and faster updates for areas that have more activity and lower update rates for areas with little or no activity. In addition, any parameter of a sensor 10 and/or actuator 20 may be adaptively changed based on the performance/damage/degradation of a sensor 10 and/or actuator 20. The ability to dynamically and automatically adjust operating parameters is one way in which the system generates efficiencies by cost effectively allocating computational and data storage resources. Furthermore, more efficient communications, less data storage, and less infrastructure is required than would be otherwise.

Figure 6A:
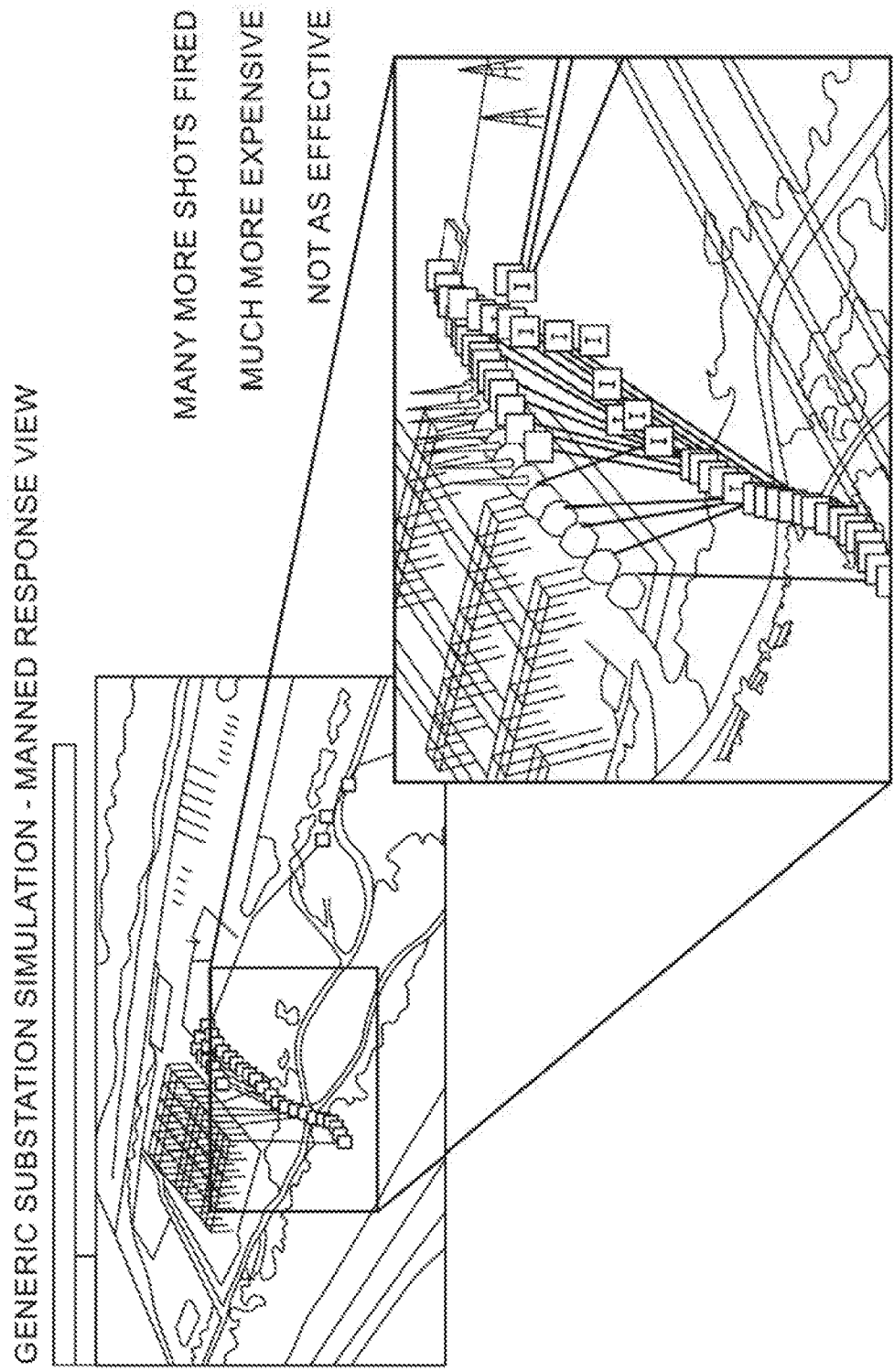

Referring now to FIGS. 6A-C, failure analysis modeling and result summary reports that may be generated by the system to define a level of capability for a given area/asset, which may be based on the S.W.O.T type analysis. By running all learned scenarios and countermeasures to iteratively refine countermeasure responses until the prescribed level of capability is achieved, the system may provide a quantifiable level of preparedness by which users can use for decision making. For instance, failure analysis may provide a user with various levels of capabilities of the system to thwart an attack, and compare them to varying levels and types of system components. As shown in FIG. 6A, a failure analysis comparison between a manned response to an attack and a response using the defense and denial system reveals that the manned response provides inadequate security at an increased cost. With the various failure analysis results for each scenario, a user may make an informed decision and/or perform a cost-benefit analysis as to how many system components are necessary to achieve a desired level of security. In addition, the software 30 may perform cost-benefit analyses for optimal selection, placement, and installation of actuators 20, sensors 10, and other components, as shown in FIGS. 6B-C. This analysis may include cost-benefit analyses associated with reduction in manned security guards for various configurations of the system. While this may be particularly beneficial during initial set-up, the software 30 may run this application continuously or periodically after initial set-up.

Placement of the sensors 10 and actuators 20 may be done to provide defense in-depth protection by applying concentric circle theory. For example, concentric circles of sensors 10 and actuators 20 may be generates, wherein each circle may provide a different level of protection and/or generate a countermeasure based upon the distance the circle is from the physical asset/area. In this regard, an actuator 20 within an outermost circle may generate an emission to prevent an adversary from moving closer (i.e., in range to cause damage), whereas an actuator 20 in an inner most circle may generate an emission to pin the adversary in a certain location. In addition, the intensity and the debilitating effect of the actuators 20 may increase as an adversary advances through the concentric circles. The description of the concentric circles above is not meant to be limiting, and it is understood that other levels of intensity and differentiated countermeasure responses may be utilized.

Logical Control Software

Logical control software employs decision-making algorithms to implement sequences in accordance with countermeasures, but without execution of the response. Whether the actuators 20 are lethal or non-lethal, a human-in-the-loop may make the decision as to implement the countermeasures or not. With logic control software, situational awareness for the human-in-the-loop may be achieved via a geospatial GUI to inform the human-in-the-loop that a potential attack by an adversary is imminent or in progress. This may be presented to the user via the command and control GUI 60 of FIG. 8B. The human-in-the-loop would respond by taking control of the actuators 20 via the interactive icon GUIs via peripheral interface devices. With logic control software, once an occurrence is detected, the system prepares the components for execution of a countermeasure, but reserves execution thereof to be performed by the human-in-the-loop. As describe earlier, the logical control software may be used in addition to, or in the alternative to, the automated reasoning engine.

Control Room Software

Control room software may be used to illustrate the situational awareness of an occurrence and identified threats and present suggested and countermeasures, as well as provide the provenance of the underlying decision-making of the application software 30. In a situation where the system is not fully automated, a user may be given the option to provide a conditioned response before a countermeasure is effectuated. This may be a simple go/no-go response or it may require more involvement whereby a user selects countermeasures and/or takes control of actuators 20 and other components. Whether fully automated or not, the illustration of the situational awareness may be used to enable a user (e.g., a supervisory human) to make a decisions. Such decisions may extend beyond merely controlling components of the system. For example, the situational awareness may assist users in making decisions to provide for their own safety, contact appropriate emergency personnel, disable and/or lockdown certain operations of the facility, etc. This may include presenting the learned scenarios and other probabilistic information associated with countermeasures taken to address the threats to a user on the computer device 101. Simulation software (e.g., PSIM software) may be included with the control room software for displaying the likely effectiveness and predicted outcomes of various scenarios.

Various geospatial software can be used to generate GUIs on a computer device 101 representative of the simulation, which may be 2-D and/or 3-D representations of the landscape and topography that accurately illustrates the actual scene in real time. The simulation software may generate a GUI similar to the GUI illustrated in FIG. 8B; however, it is understood that other GUI configurations may be used that are better adapted to a user's particular system.

Simulation software may include human-machine-interface (HMI) control software with live icons embedded in a geospatial software environment. The HMI software integration may be accomplished via API, third party software, middleware, or at the source code level of any and/or all electronic security access control and alarm management (ACAMS), physical security information management systems (PSIMs), emergency management, public safety computer-aided dispatch systems, evacuation management systems, geospatial and/or GIS software, digital systems controls, logical systems controls, system controls and data acquisition software, and any associated GUI software for these software components. In this regard, the system collects and correlates events from existing disparate security devices and information systems (video, access control, sensors, analytics, networks, building systems, etc.) to further increase robustness, improve response times, and generate efficiencies.

While it is illustrated for the display to be within a control room, the system is certainly not limited to such configuration. As will be described in more detail within the computer architecture section, any computer display device capable of enabling inputs via interfacing software may be used. Therefore, computer devices 101 outside of the control room, mobile computer devices, and other computer devices in connection with the computer network 100 may be used to exercise control of components of the system. For instance, a user may become the human-in-the-loop while positioned in a vehicle and using a laptop computer. Furthermore, there may be multiple humans-in-the-loop exercising command and control of various portions of the system.

As described above, the defense and denial system may be used to augment passive physical systems (whether they are already installed or installed concurrently with the defense and denial system) or it may be used as a stand-alone system. When augmenting the passive physical protective system, the method may include harvesting latent capabilities of, and adding potentially exponential value to, the passive system. Whether augmenting existing systems or being used as a stand-alone system, multiple unconnected security applications, actuators 20, and sensors 10 may be integrated via one comprehensive user interface, thereby creating an integration relationship of the various manufacturers' existing software modules that may form the capability for end user system operators to take control of remote actuators 20. In addition to closing the time gaps between detection, response, and neutralization, these features also add robustness and generate additional efficiencies to the system.

Figure 7A:
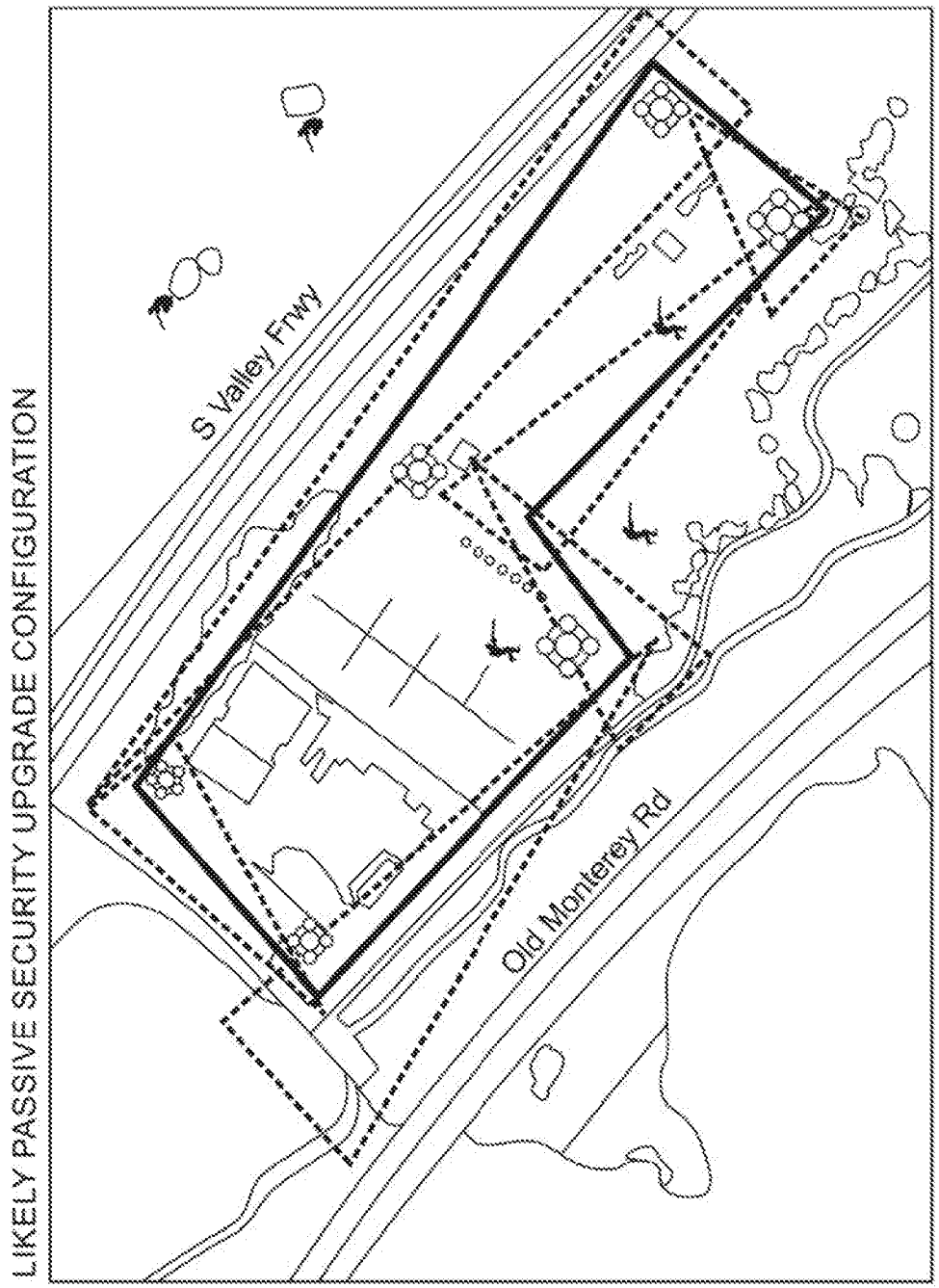
FIGS. 7A and 7B are a display of a passive physical protective system layout with adversaries coordinating an attack, and an illustration of the time required to overcome the passive physical protective system, respectively.
Figure 7B:
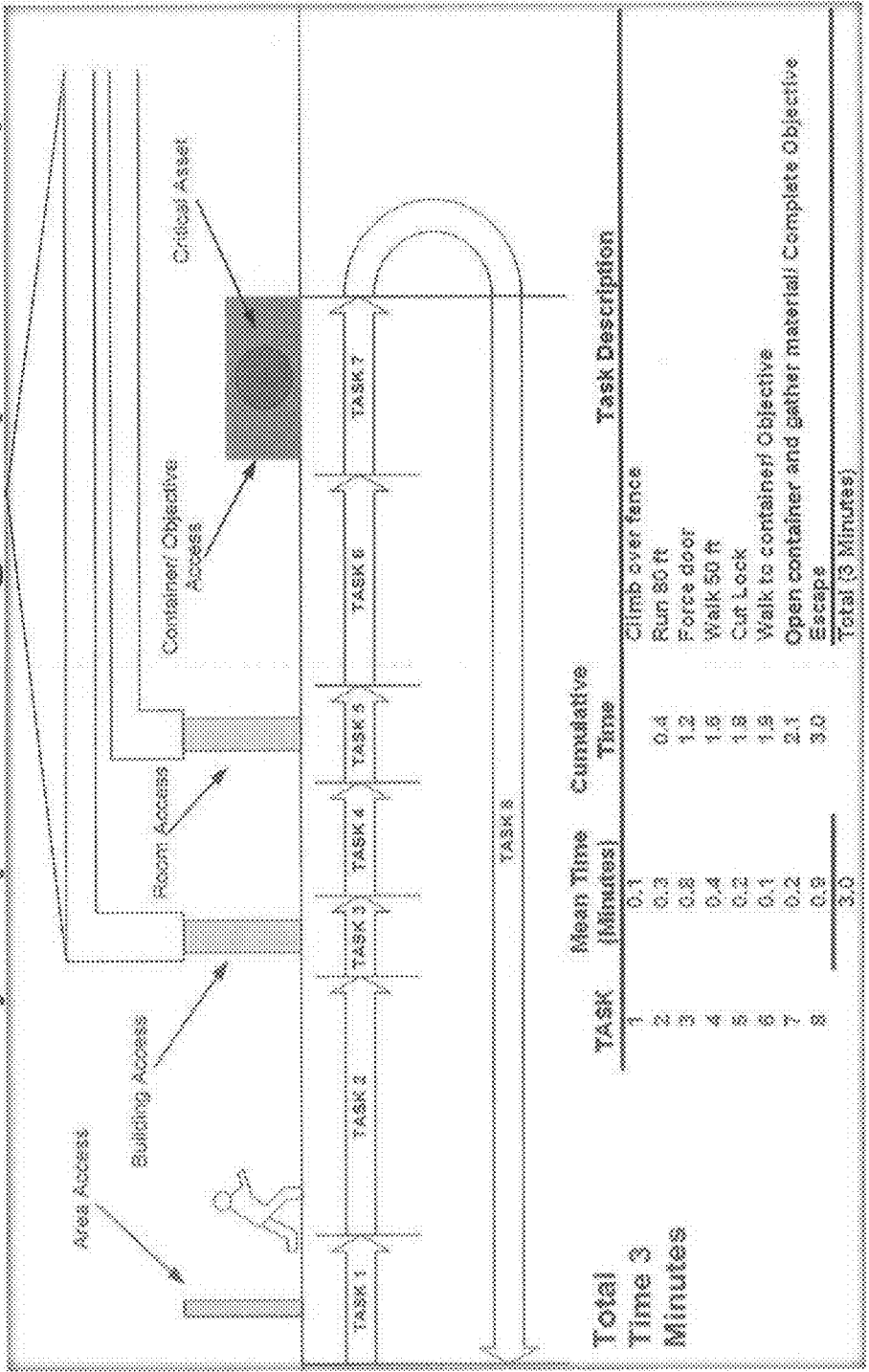

FIG. 7A illustrates a typical passive physical protective system layout with adversaries coordinating an attack, and FIG. 7B illustrates that overcoming the passive physical protective systems of climbing the fence and cutting the lock requires only 0.2 minutes. After overcoming the passive physical systems, the adversaries may accomplish their objective in as little as 3 minutes.

As seen in FIG. 8A, the defense and denial system may be used to establishes a multi-phenomenology sensor 10 array that provides a 360° A coverage beginning from inside the critical infrastructure extending out to a distance that may be prescribed/determined by the system and in accordance with the level of capability chosen from the failure analysis. Critical infrastructure and likely avenues of approach by adversaries to the critical infrastructure site may be ascertained, as well as possible staging areas, funnel points, natural defilades, sniper/standoff positions, throughways, etc. Sensor analytics may be configured to establish regions of interest. For instance, sensor-sensitivity in a certain area may be increased because it would be a good sniper position for an adversary. In addition, various waypoints the adversary would likely traverse as they perform their sequences of attack tasks and/or respond to countermeasures may be identified so that the software 30 may be programmed to concentrate combat power to those areas. FIG. 8A reveals that no area is left unobserved by the sensor array, critical areas obtain redundant coverage with minimal cost, and adversaries can be detected and engaged even beyond the perimeter of the facility.

API may be used to integrate sensors 10 and actuators 20 with the IC so that the IC can react to collective sensor 10 information. Placement of the sensors 10 and actuators 20 may be done to create concentric circles of protection, with each circle providing a varying degree of protection. With the method of implementation described below, the integration may be used to extend nonlethal protection up to two miles beyond the perimeter of the area/asset, thus potentially increasing the time the adversaries are delayed by a multiple of perhaps ten or more.

Implementation of the system may include calibrating sensors 10 with mock attacks by persons skilled in paramilitary tactics physically performing attack sequences. This may include use of live fire and attempts to complete real objectives. The precision of the system may be continuously improved by using the sensors 10 (e.g., LIDARs) to continuously or periodically measure distances and geospatially map the area to update the multi-phenomenology and assessment of component placement.

Figure 9:
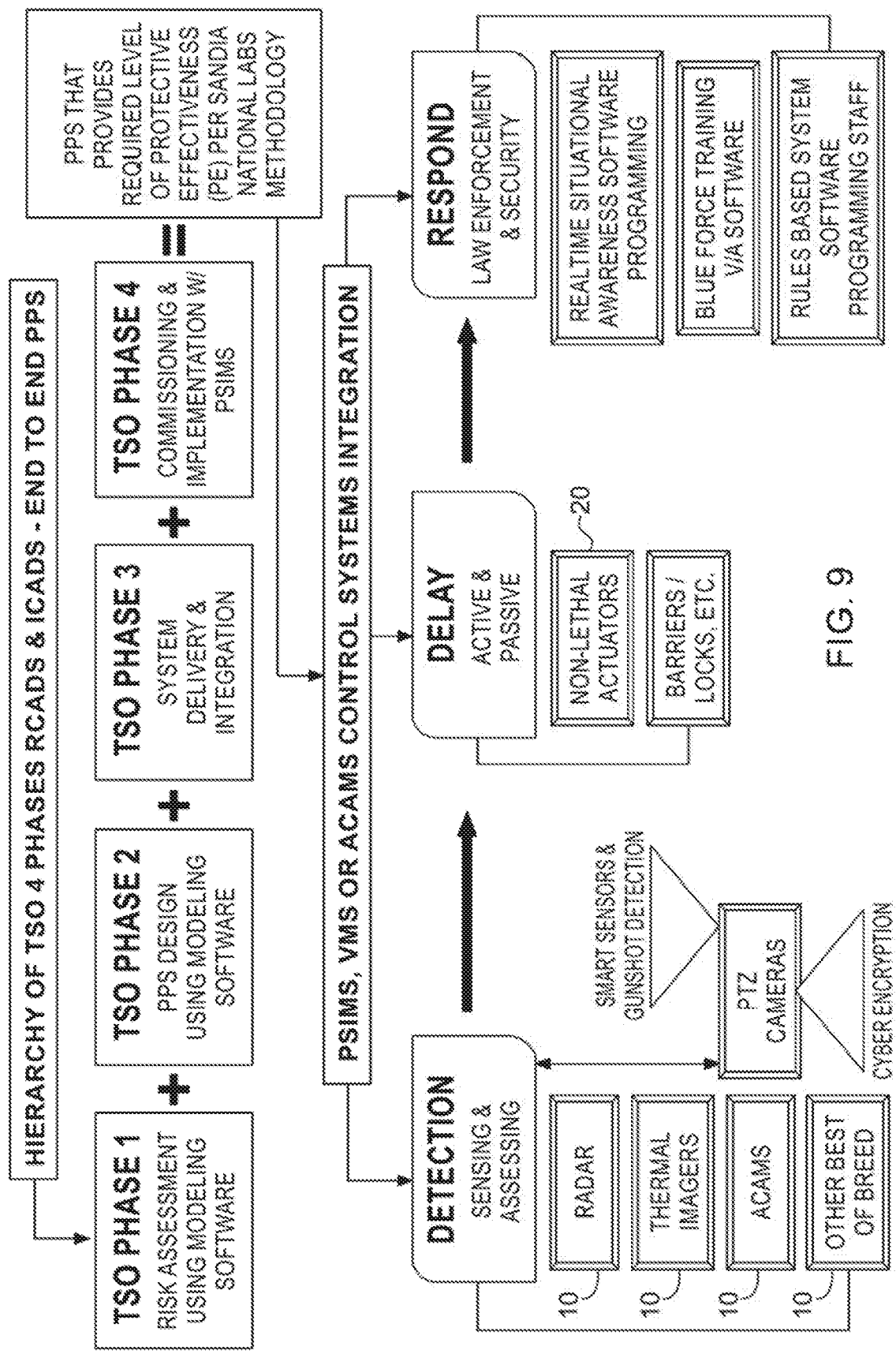
FIG. 9 is a flow diagram for a method of utilizing the system.

A four-phase implementation structure may be used to customize the method and system for a given physical asset/area. (See FIG. 9). The phases may include a Risk Assessment phase, a Physical Protection System (PPS) Design phase, a System Delivery and Integration phase, and a Commissioning and Implementations phase.

The Risk Assessment phase may include identification of critical assets within the area to be protected, as well as vulnerabilities and associated potential consequences. This may include the Sandia National Laboratories Risk Assessment Methodology (RAM) approach or other similar methodologies where threats, consequences, and protective effectiveness are computed via mathematical equation to arrive at qualified or quantified risk. This is generally accomplished in a collaborative effort (including in workshops) with users to address security vulnerabilities and associated potential consequences and threats. The Risk Assessment phase generally includes identification of critical assets within the area to be protected, as well as the assets' vulnerabilities to postulate adversary initiated scenarios and associated potential consequences. The adversary scenarios can be constructed using Monte Carlo or other simulation and modeling software such as ARES AVERT™.

Design Basis Threats are parameters that use context factors, sensor data, and actuator data to generate a quantifiable value used as a variable within the decision rules. This enables the decision rules to operate as parameters within the automated reasoning and logic control software so that the countermeasure implemented by the system has the highest probability of mitigating damages caused by the occurrence. The exemplary Design Basis Threat Spectrum shown in FIG. 10 is illustrative of the spectrum of threat types that may be postulated given intelligence collected from various intelligence and law enforcement agencies, and from a design basis for subject matter expert (SME) to design various aspects of the defense and denial system (e.g., barriers, alarms, sensors, access control devices, non-lethal actuators, human-machine and graphical user interfaces, etc.). In this regard, a SME would feed Design Basis Threat spectrum threat type information into simulation and modeling software. The simulation and modeling software may then determine and/or predict the likely scenarios (behavior patterns and tactics) of each Design Basis Threat type. Decision rules and adversary tasks may be developed and programmed based on the scenarios that are developed as a result of running the simulation and modeling software.

The system does not have to identify which threat is attacking to be effective, just what specific tactics are being used and which countermeasures to aggregate and implement to debilitate and delay which ever threat or threats are attacking. If the threat is a Design Basis Threat that is shooting at the protected site, then the system may react to disrupt the Design Basis Threat's ability to hit the target by inhibiting the Design Basis Threat's sight and sending painful and/or distracting sounds at him/her.

The system may be programmed to respond to behavior by the adversary that is "threatening" based on the adversary's behavior that fits the pattern of a threat. The system can compute vulnerabilities that could be exploited by an adversary, whereby the response of the system may be to evaluate the situation based on a pattern of behavior of the adversary relative to the potential risk and generate a countermeasure to minimize the risk. The decision rules may have two parts: an antecendent that is describing a pattern; and, a consequent that describes a response. Using fuzzy or probabilistic terms in the consequent means that a given behavior will match the antecedent to a degree. Thus, each rule acts as an "archetype" for all the behaviors that are "similar" to that pattern, and the rules represent the learned scenarios. The developing scenario may be compared to each learned scenario rule by matching to a degree. A given behavior might match multiple rules to varying degrees. The best match or some combination of best matches is used to determine the response.

Characterization of threats within a threat-level range (e.g., High, Medium, Low) threat levels may be based on the specific tasks and activities the person(s)/vehicle(s) of interest are performing at the time of the possible attack, and the countermeasure may be modified according to the characterized threat level. The characterization is dynamic based on data being continuously gathered and analyzed via the feedback loop and the assessments based upon the situational awareness.

The Physical Protection System (PPS) Design phase may include developing an effective design to thwart attacks. Concepts of operations (CONOPS) may be developed to provide options for mitigating the vulnerabilities and reducing the associated risk, which may be based on budgetary constraints and risk tolerance. CONOPS options may also be used to increase the protective effectiveness of the system. These concepts may include site access, site layout, all spectrum lighting, emergency evacuation, current technologies, physical security and responder personnel capabilities, cyber security technologies, etc. With these concepts in mind, a design of the type and placement of actuators, sensors, and other components may be generated.

The PPS Design phase may occur in two parts. Part I may include developing an effective design to thwart attacks. All of the adversary scenarios previously constructed by using simulation and modeling software, such as ARES AVERT™, Monte Carlo™, etc. may be rerun against iterations or options of the PPS Design in iterations. In each subsequent conceptual PPS Design iteration, changes may be made to reach the desired level of protective effectiveness and corresponding risk reduction. These changes may include, but are not limited to, adding/upgrading equipment, adding/upgrading security system software, configuring and programming software to further define and implement changing requirements in system automation, automated reasoning, and HMI behavior, which may be done in concert with planning for human tasks and procedures, modifying built environments (e.g., improving blast protection by adding additional barriers, increasing standoff, etc.), and, changing topographical features to increase the level of difficulty for adversaries while negotiating and traversing the landscape on various postulated paths to the critical infrastructure being protected.

Part II may include another design phase to design tasks and activities for developing construction, project management, and implementation documents. These may include, but are not limited to, engineered drawings, specifications, security operational procedures, response training master planning, project budget(s) etc.

The System Delivery and Integration phase may include installation and functionality testing of components prescribed by the PPS Design phase. This may include a highly-specialized project management process that is customized to ensure delivery of the complete intelligently integrated solution installation. In the case of critical infrastructure utilities that are governed by regulators, compelling justifications for cost recovery to the regulatory bodies (e.g., public utility or public service commissions) with the aid of simulation and modeling software that demonstrates the security solution(s) implemented by the utility are the most efficacious and cost-effective. This may include demonstrations that the maximum level of protective effectiveness is achieved given the amount of money spent.

The Commissioning and Implementations phase may include testing and validating system performance, establishing operating procedures, conducting response exercises, and conducting training of physical security personnel. This may include initial and ongoing testing and validating of system performance, establishing operating procedures, conducting response exercises, and conducting training of physical security personnel. On-going consideration and evaluation of new threats and technology may be factored and cycled through starting at the first phase to update the system. Training is provided in-part by using virtual, interactive combat-realistic simulation & training simulator software. This may be ARES BlueTrain™ training software or other software that delivers high fidelity visualization of simulation and modeling analysis results. The simulation & training simulator software may be programmed to support single or multiple participant training sessions.

In addition, the four phase implementation may be iterated periodically, or as needed, to maintain and/or improve a desired level of protection. In this regard, simulation and modeling software may be used in the reevaluation and redesign of the system.

EXAMPLE

In an exemplary embodiment, the method to actively protect a physical asset/area through defense and denial may include: receiving, by a computer network, sensor data associated with characteristics of an environment corresponding to a physical asset/area from a sensor configured to identify an occurrence; identifying, by the computer network, an occurrence as a threat and developing situational awareness; generating, by the computer network, a plurality of countermeasures; applying, by the computer network, decision rules to select a countermeasure; transmitting, by the computer network, countermeasure data to an actuator, wherein the countermeasure data is configured for activating the at least one actuator; and, generating a continuous feedback loop, via the computer network, for receiving actuator data and the sensor data, re-characterizing the occurrence, re-developing situational awareness, re-generating the plurality of countermeasures, and re-applying decision rules to adaptively re-transmitting countermeasure data.

Receiving sensor data, characterizing the occurrence, generating the plurality of countermeasures, applying decision rules, transmitting countermeasure data, and generating the continuous feedback loop may performed by at least one of logic control software and automated reasoning engine software. Identifying the occurrence as a threat may be based upon a probability that the occurrence will create a risk to the physical asset/area, where applying the decision rules may include at least one of reducing the probability that the threat will cause the risk and delaying the time required for the threat to become the risk.

The occurrence may be a person detected by the sensor, where activating the actuator includes generating non-lethal and nondestructive emissions in response thereto. Applying the decision rules in this situation may include denying or delaying the person from becoming risk, which may comprise disrupting movements of the person.

Generating the plurality of countermeasures may comprise mathematically modeling learned scenarios and mathematically modeling a current occurrence, where the method may then generate a user graphical interface displaying the learned scenarios, the current occurrence, and the plurality of countermeasures. Design Basis Threats may be used to determine and predict likely scenarios of each threat type, and decision rules can be developed at least in part on the likely scenarios. In addition, the threats can be characterized within a threat-level range base on specific tasks and activities the person is performing at the time of the occurrence.

Computer System Architecture

Referring back to FIG. 2, a computer network that may be used with the system, is disclosed. Wherever a user is referenced in this disclosure, it is understood that this reference includes the associated computer device(s) 101, computer server(s) 102, database(s) 103, and/or uses thereof. Distributed communication networks 104 used to enable connection and communication between each computer device 101 are common in the art. Each computer device 101 may communicate in whole, or in part, via web-sites through a communication network 104, which may include a web-server.

Interactions between a user, the actuators 20, sensors 10 and the computer network 100 may be implemented using hardware, software, firmware, non-transitory computer readable media having instructions stored thereon, or a combination thereof, and may be implemented in a single or multiple of computer systems or other processing systems. Hardware, software, or any combination thereof may embody modules and components used to execute functions of the system.

If programmable logic is used, such logic may execute on a commercially available processing platform or a special purpose device. A person having ordinary skill in the art will appreciate, with the benefit of the present disclosure, that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device 105 and a memory 106a, 106b may be used to implement the herein described embodiments.

A processor device 105, as discussed herein, may be a single processor, a plurality of processors, or combinations thereof. Processor devices 105 may have one or more processor cores. The terms computer program medium, non-transitory computer readable medium, and computer usable medium, as discussed herein, are used to generally refer to tangible media, such as, for example, a removable storage unit and a hard disk installed in a hard disk drive.

A processor device 105 may be a special purpose or a general purpose processor device. A processor device 105 may be connected to a communication infrastructure. A communication infrastructure may include, but is not limited to, a bus, message queue, network, multi-core message-passing scheme, etc. The network 100 may include a main memory 106*a*. A main memory 106*a* may include, but is not limited to, a random access memory, a read-only memory, etc. The network 100 may include a secondary memory 106*b*. A secondary memory 106*b* may include, but is not limited to, a hard disk drive, a removable storage drive, a floppy disk drive, a magnetic tape drive, an optical disk drive, a flash memory, etc. A memory 106*a*, 106*b* may be a non-volatile memory.

A removable storage drive may read from and/or write to a removable storage unit in a well-known manner. A removable storage unit may include a removable storage media that may be read by, and written to, a removable storage drive. For example, if a removable storage drive is a floppy disk drive, a removable storage unit may be a floppy disk. A removable storage unit may be non-transitory computer readable recording media.

In some embodiments, a secondary memory 106*b* may include alternative means for allowing computer programs or other instructions to be loaded into the network 100. This may be, for example, a removable storage unit and/or an interface. Examples of such means may include, but are not limited to, a program cartridge and cartridge interface (e.g., as found in video game systems), a removable memory chip (e.g., EEPROM, PROM, etc.) and associated socket, and/or other removable storage units and interfaces, as will be apparent, with the benefit of the present disclosure, to persons having skill in the relevant art.

The network 100 may include a communications interface 107. A communications interface 107 may be configured to allow software and data to be transferred between the network 100 and external devices. Communications interfaces 107 may include, but are not limited to, a modem, a network interface (e.g., an Ethernet card), a communications port, a PCMCIA slot and card, etc. Software and data transferred via a communications interface may be in a form of signals, which may be electronic, electromagnetic, optical, or other signals as will be apparent, with the benefit of the present disclosure, to persons having skill in the relevant art. Signals may travel via a communications path 108, which may be configured to carry signals and may be implemented using wire, cable, fiber optics, a phone line, a cellular phone link, a radio frequency link, etc.

Computer program medium and computer usable medium may refer to memories, such as a main memory 106*a* and a secondary memory 106*b*, which may be memory semiconductors (e.g. DRAMs, etc.). These computer program products may be means for providing software to the network 100. Computer programs (e.g., computer control logic) may be stored in a main memory 106*a* and/or a secondary memory 106*b*. Computer programs may also be received via a communications interface 107. Such computer programs, when executed by a processor device 105, may enable the network 100 to execute commands and act upon the various components of the system. Accordingly, such computer programs may represent controllers of a disclosed network 100. Where the present disclosure is implemented using software, the software may be stored in a computer program product and loaded into the network 100 using a removable storage drive, an interface, a hard disk drive, and/or a communications interface 107.

A computer device 101 may be a processor, a microprocessor, minicomputer, server, mainframe, laptop, personal data assistant, wireless email device, cellular phone, smartphone, pager, fax machine, scanner, or any other programmable device configured to enable transmission and/or reception of data, which may be over a network. A computer device 101 may include a peripheral device, such as an input/output device. A peripheral device may include, but is not limited to, a keyboard, a mouse, a screen display, a touch screen, a pen, a monitor, a printer, a hard disk drive, a floppy disk drive, a joystick, an image scanner, etc.

One or more electronic computer networks may be utilized by the network 100 to promote communication among different components, transfer data, and/or share resource information. Such computer networks may be embodied as, but not limited to, at least one of Ethernet, wireless LAN, MAN, WAN, VPN, SAN, GAN, HomePNA, etc.

Various embodiments of the present disclosure are described in terms of this example computer network 100. It will become apparent, with the benefit of the present disclosure, to a person skilled in the relevant art how to implement the system using other embodiments of the computer network 100, along with other embodiments of computer architectures. Although operations may be described as a sequential process, some of the operations may be performed in parallel, concurrently, and/or in a distributed environment, and with program code stored locally or remotely for access by single or multi-processor machines. In some embodiments, the order of operations may be rearranged without departing from the spirit of the disclosed subject matter.

The computer network 100 may comprise a processor 105 that may be operatively associated with at least one module 109, which may be programmed to display panels 110 and/or screen displays 113 on a computer device monitor 111. The processor 105 may be programmed to execute computer-readable instructions included within a module 109. Computer-readable instructions may be in a form of application software stored on a non-transitory computer readable medium operatively associated with a processor 104. Each module 109 may be configured to generate a GUI and/or other user interface enabling at least one user to issue commands, access data stored on a data storage media operatively associated with the processor 105, and/or transmit data to and from the data storage media. A module 109 may include software, firmware, hardware, or any reasonable combination thereof.

A module 109 may be programmed to display at least one panel 110. A panel 110 may be configured to display information and grant access to data related to certain aspects and functionalities of the system. Different panels 110 of each module 109 may be programmed to enable display and interaction between users, components of the system, and the system itself in different ways. The differentiated displays and interactions of the various modules 109 and panels 110 may be configured to enable concerted interaction, filter display of information, and secure containment of sensitive information. Through the various modules 109 and panels 110, the computer network 100 provides a communication network 104 to orchestrate interaction between a user, the system, and the various components of the system.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. A method to actively protect a physical asset and/or a physical area through defense and denial, comprising:
receiving, by a computer network using at least one fuzzy logic controller, sensor data associated with characteristics of an environment corresponding to a physical asset and/or a physical area from at least one sensor configured to identify an occurrence;
identifying, by the computer network using the at least one fuzzy logic controller, the occurrence as a threat based upon a probability that the occurrence will create a risk to the physical asset and/or the physical area and developing situational awareness;
generating, by the computer network using the at least one fuzzy logic controller, a plurality of countermeasures, each countermeasure including a probabilistic outcome of accomplishing: a) a reduction in the probability that the threat will cause the risk; and/or b) a delay in the time required for the threat to become the risk, wherein the probabilistic outcome for each countermeasure is determined by failure analysis modeling and the threat's response to the countermeasure;
applying, by the computer network using the at least one fuzzy logic controller, decision rules to select at least one countermeasure for generating a response to the threat, the response including the at least one countermeasure having the highest probabilistic outcome of accomplishing the reduction and/or delay;
transmitting, by the computer network using the at least one fuzzy logic controller, countermeasure data representative of the response to at least one actuator;
activating, based on the countermeasure data, the at least one actuator to implement the response;
generating a continuous feedback loop, via the computer network using the at least one fuzzy logic controller, for receiving actuator data and the sensor data, and dynamically re-characterizing the occurrence, re-developing situational awareness, re-generating the plurality of countermeasures, re-applying decision rules to adaptively re-transmit countermeasure data;
re-activating at least one actuator to implement a new response based on information provided by the fuzzy logic controller based continuous feedback loop; and
dynamically and continuously tracking and targeting the threat and continuously delivering the at least one countermeasure to force a desired change in adversarial behavior of the threat that reduces or eliminates the risk to the physical asset and/or physical area presented by the threat;
wherein receiving sensor data, characterizing the occurrence, generating the plurality of countermeasures, applying decision rules, transmitting countermeasure data, and generating the continuous feedback loop are performed by fuzzy logic controller based automated reasoning engine software.

2. The method recited in claim 1, wherein receiving sensor data, characterizing the occurrence, generating the plurality of countermeasures, applying decision rules, transmitting countermeasure data, and generating the continuous feedback loop is performed by fuzzy logic control software.

3. The method recited in claim 1, wherein the occurrence is at least one person detected by the at least one sensor.

4. The method recited in claim 3, wherein activating the at least one actuator comprises generating non-lethal and nondestructive emissions.

5. The method recited in claim 4, wherein when the at least one person is identified as the threat, applying the decision rules to select the at least one countermeasure for generating the response to the threat comprises denying or delaying the at least one person from presenting the risk.

6. The method recited in claim 5, wherein denying or delaying the at least one person from presenting the risk comprises disrupting movements of the at least one person.

7. The method recited in claim 1, wherein the failure analysis modeling comprises mathematically modeling learned scenarios and mathematically modeling a current occurrence by the at least one fuzzy logic controller.

8. The method recited in claim 7, further comprising generating a user graphical interface displaying the learned scenarios, the current occurrence, and the plurality of countermeasures.

9. The method recited in claim 7, wherein Design Basis Threats are used to determine and predict likely scenarios of a threat type.

10. The method recited in claim 9, wherein the decision rules are developed at least in part on the likely scenarios.

11. The method recited in claim 3, wherein the threat is characterized within a threat-level range based on specific tasks and activities the at least one person is performing at the time of the occurrence.

12. The method recited in claim 1, wherein the decision rules comprise constraint production rules which inhibit activation of the at least one countermeasure based on an analysis of context factors including political, environmental, technological and social factors.

13. A system to actively protect a physical asset and/or a physical area through defense and denial, comprising:
a computer network having at least one processor, a non-transitory storage medium, at least one fuzzy logic controller, and a computer device with a display;
at least one actuator in communication with the computer network;
at least one sensor in communication with the computer network; and,
application software on the non-transitory storage medium programmed to exercise command and control of the system and display an interface on the computer device enabling a user to exercise command and control of the system via at least one module;
wherein the application software includes fuzzy logic controller based automated reasoning engine software programmed to automatically coordinate activation of the at least one actuator and sensor in accordance with fuzzy logic controller based decision rules to detect, identify, and localize threats of occurrences and implement at least one countermeasure in response thereto;
wherein the fuzzy logic controller based decision rules are parameters programmed into the application software to identify the threats based on a probability of the occurrences creating a risk to a physical asset and/or a physical area and to direct activation of the at least one actuator and sensor during implementation of the at least one countermeasure;
wherein each countermeasure includes a probabilistic outcome of accomplishing: a) a reduction in the probability that the threats will cause the risk; and/or b) a delay in the time required for the threats to become the risk, wherein the probabilistic outcome for each countermeasure is determined by failure analysis modeling and the threat's response to the countermeasure;
wherein the at least one countermeasure is a concerted activation of the at least one actuator and sensor to mitigate damage to the physical asset and/or the physical area posed by the threats;

wherein sensor data is transmitted from the at least one sensor to at least one of another sensor, the at least one actuator, and the computer network and processed by the application software to develop the at least one countermeasure;

wherein the response is the at least one countermeasure that will be carried out by the at least one actuator that has the highest probabilistic outcome of accomplishing the reduction and/or delay;

wherein the processor dynamically and continuously tracks and targets the threat and continuously delivers the at least one countermeasure to force a desired change in adversarial behavior of the threat that reduces or eliminates the risk to the physical asset and/or physical area presented by the threat; and wherein during implementation of the response, countermeasure data is transmitted from the computer network to at least one of the actuator and the sensor via a fuzzy logic controller based continuous feedback loop to dynamically re-characterize the occurrence, re-develop the countermeasure, re-transmit countermeasure data, and re-activate at least one actuator to implement a new response.

14. The system recited in claim 13, wherein:

the at least one sensor is configured to detect and record characteristics of an environment near the physical asset and/or the physical area so as to detect the occurrences and collect data regarding the occurrences; and, the at least one actuator is configured to generate non-lethal and nondestructive emissions at humans and equipment.

15. The system recited in claim 13, wherein the failure analysis modeling is based at least in part on at least one of mathematically modeled learned scenarios and a mathematically modeled current occurrence.

16. The system recited in claim 15, Design Basis Threats are used to determine and predict likely scenarios of a threat type.

17. The system recited in claim 13, wherein the application software is programmed to develop situational awareness by at least one of:

collecting, distilling, and fusing sensor data and automatically implementing the at least one countermeasure directed against adversaries causing the occurrences by attacking the physical asset and/or the physical area, wherein the response is configured to disrupt movements of the adversaries; and, a geospatial graphical user interface presented to the user and use of decision-making algorithms to implement sequences in accordance with the response.

18. The system recited in claim 13, wherein the decision rules comprise constraint production rules which inhibit activation of the at least one countermeasure based on an analysis of context factors including political, environmental, technological and social factors.

19. A method to actively protect a physical asset and/or a physical area through defense and denial, comprising:

receiving, by a computer network using at least one fuzzy logic controller, sensor data associated with characteristics of an environment corresponding to a physical asset and/or a physical area from a plurality of sensors positioned to sense an area surrounding that physical asset and/or physical area;

identifying, from the sensor data, at least one individual positioned within the area surrounding the physical asset and/or the physical area;

determining, from the sensor data, characteristics of the at least one individual positioned within the area surrounding the physical asset and/or the physical area;

determining, from the determined characteristics, a level of threat to the physical asset and/or the physical area posed by the at least one individual based upon a probability that the at least one individual will create a risk to the physical asset and/or the physical area;

generating a response to the determined level of threat by actuating at least one of a plurality of actuators to direct at least one non-lethal countermeasure toward the at least one individual based on the determined level of threat, each non-lethal countermeasure including a probabilistic outcome of accomplishing: a) a reduction in the probability that the at least one individual will cause the risk; and/or b) a delay in the time required for the at least one individual to become the risk, wherein:

the probabilistic outcome for each non-lethal countermeasure is determined by failure analysis modeling and the at least one individual's response to the countermeasure; and the response includes the at least one countermeasure having the highest probabilistic outcome of accomplishing the reduction and/or delay;

generating a fuzzy logic based continuous feedback loop to continually and dynamically determine the level of threat to the physical asset and/or the area and the probabilistic outcome of the at least one non-lethal countermeasure;

re-activating at least one actuator to implement a new response based on information provided by the fuzzy logic based continuous feedback loop;

dynamically and continuously tracking and targeting the at least one individual and continuously delivering the at least one countermeasure to force a desired change in adversarial behavior of the at least one individual that reduces or eliminates the risk to the physical asset and/or physical area presented by the at least one individual; and wherein generating the response and generating the fuzzy logic based continuous feedback loop are performed by fuzzy logic based automated reasoning engine software.

20. The method recited in claim 19, wherein decision rules are used to select the at least one non-lethal countermeasure, the decision rules comprising constraint production rules which inhibit activation of the at least one non-lethal countermeasure based on an analysis of context factors including political, environmental, technological and social factors.

* * * * *